US012319116B2

(12) United States Patent
Chen et al.

(10) Patent No.: US 12,319,116 B2
(45) Date of Patent: Jun. 3, 2025

(54) MULTI-PORTS VALVE AND THERMAL MANAGEMENT SYSTEM HAVING SAME

(71) Applicant: JOHNSON ELECTRIC INTERNATIONAL AG, Murten (CH)

(72) Inventors: Anbang Chen, Shen Zhen (CN); Xiaoyu Liu, Shen Zhen (CN); Guanyin Liang, Shen Zhen (CN); Ruifeng Qin, Hong Kong (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 18 days.

(21) Appl. No.: 18/350,705

(22) Filed: Jul. 11, 2023

(65) Prior Publication Data

US 2023/0358325 A1 Nov. 9, 2023

Related U.S. Application Data

(63) Continuation of application No. PCT/CN2021/109077, filed on Jul. 28, 2021.

(30) Foreign Application Priority Data

Jan. 11, 2021 (CN) .......................... 202110034458.9

(51) Int. Cl.
*B60H 1/00* (2006.01)
*B60H 1/32* (2006.01)
(Continued)

(52) U.S. Cl.
CPC ..... *B60H 1/00278* (2013.01); *B60H 1/00885* (2013.01); *B60H 1/32284* (2019.05);
(Continued)

(58) Field of Classification Search
CPC ............ F16K 11/0853; B60H 1/00278; B60H 2001/00307; B60H 1/00885; B60H 1/32284; B60H 2001/00928; B60K 11/02
See application file for complete search history.

(56) References Cited

U.S. PATENT DOCUMENTS

2021/0381607 A1* 12/2021 Koch ................... F16K 11/0853
2023/0407980 A1* 12/2023 Wang ..................... B60K 11/02

FOREIGN PATENT DOCUMENTS

CN    105715828 A    6/2016
CN    205618731 U    10/2016
(Continued)

OTHER PUBLICATIONS

WO2022148010—English Translation of International Search Report and Written Opinion dated Jul. 14, 2022 Jul. 14, 2022.
(Continued)

*Primary Examiner* — Atif H Chaudry
(74) *Attorney, Agent, or Firm* — Aird & McBurney LP

(57) ABSTRACT

A multi-port valve includes a valve housing and a valve core. The valve housing includes a plurality of ports arranged in a circumferential direction. All the ports are grouped into at least two port groups. Each of the port groups includes a main port and a plurality of sub-ports. The valve core is rotatably mounted to the valve housing and defines at least two flow channels. The multi-port valve has a plurality of work modes in response to the valve core rotated as regard to the valve housing to different positions. In different work modes, each of said at least two flow channels is configured to selectively communicate one of the main ports with one of the sub-ports.

7 Claims, 24 Drawing Sheets

(51) Int. Cl.
  *B60K 11/02* (2006.01)
  *F16K 11/085* (2006.01)
(52) U.S. Cl.
  CPC .............. *F16K 11/0853* (2013.01); *B60H 2001/00307* (2013.01); *B60H 2001/00928* (2013.01); *B60K 11/02* (2013.01)

(56) References Cited

FOREIGN PATENT DOCUMENTS

| CN | 111623146 A | 9/2020 |
|---|---|---|
| CN | 112066036 A | 12/2020 |
| CN | 212297747 U | 1/2021 |
| GB | 1549100 A | 7/1979 |

OTHER PUBLICATIONS

205618731—English Translation.
11623146—English Translation.
112066036—English Translation.
212297747—English Translation.

\* cited by examiner

MULTI-PORTS VALVE AND THERMAL MANAGEMENT SYSTEM HAVING SAME

CROSS REFERENCE TO RELATED APPLICATIONS

This non-provisional patent application is continuation application of PCT Application No. PCT/CN2021/109077, filed with the Chinese Patent Office on Jul. 28, 2021, which claims priority to Chinese Patent Application No. 202110034458.9, filed on Jan. 11, 2021, all of which are incorporated herein by reference in their entirety.

FIELD OF THE INVENTION

The invention relates to the technical field of valves, in particular to a multi-ports valve and a thermal management system having the multi-ports valve.

BACKGROUND

A valve is a controlling component in the fluid delivery system, which can be used to control the on-off, flow direction, etc. of the fluid. For example, in the thermal management system of new energy vehicles, valves are usually required to control flow of coolant. A common thermal management system of vehicle includes several cooling circuits (e.g., battery cooling circuits and electric drive system cooling circuits), and several heat exchangers (e.g., radiators and chillers). In real operation of the automotive thermal management system, it is always necessary to integrate multiple cooling circuits and multiple heat exchangers to achieve different work modes. An existing thermal management system of vehicle has several coolant valves to transfer coolant between multiple cooling circuits and/or multiple heat exchangers to achieve different operating modes. Such a vehicle thermal management system has a complex structure and high cost.

SUMMARY OF THE INVENTION

The present invention aims to provide a multi-port valve that can solve the above-mentioned problems or at least alleviate the above-mentioned problems to a certain extent, and a thermal management system having the multi-port valve.

A multi-port valve includes a valve housing and a valve core. The valve housing includes a plurality of ports arranged in a circumferential direction. All the ports are grouped into at least two port groups. Each of the port groups includes a main port and a plurality of sub-ports. The valve core is rotatably mounted to the valve housing and defines at least two flow channels. The multi-port valve has a plurality of work modes in response to the valve core rotated as regard to the valve housing to different positions. In different work modes, each of said at least two flow channels is configured to selectively communicate one of the main ports with one of the sub-ports.

DETAILED DESCRIPTION OF THE PREFERRED EMBODIMENTS

The present invention will be further described below based on the drawings and the embodiments.

Figure 1:
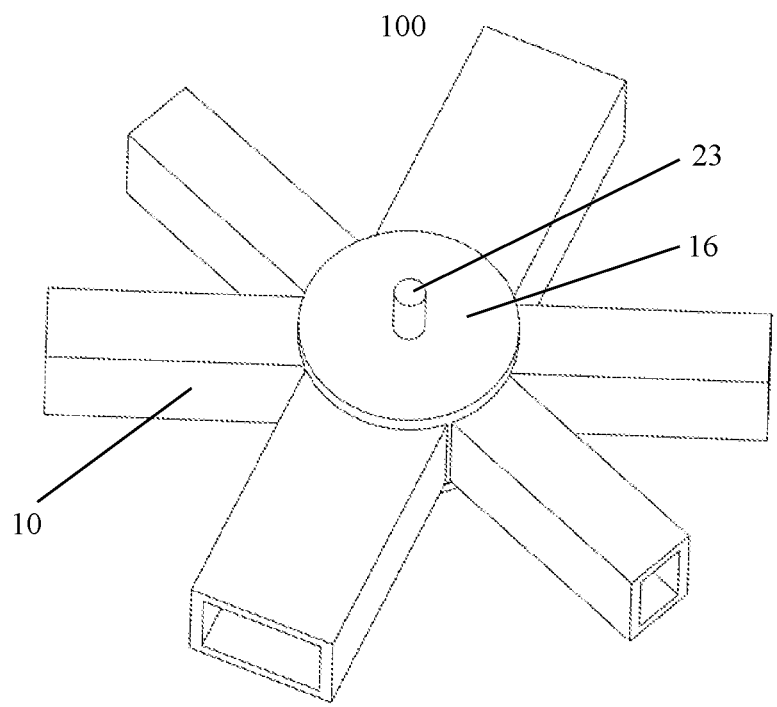
FIG. 1 is a perspective view of a multi-port valve according to a first embodiment of the present invention.
Figure 2:
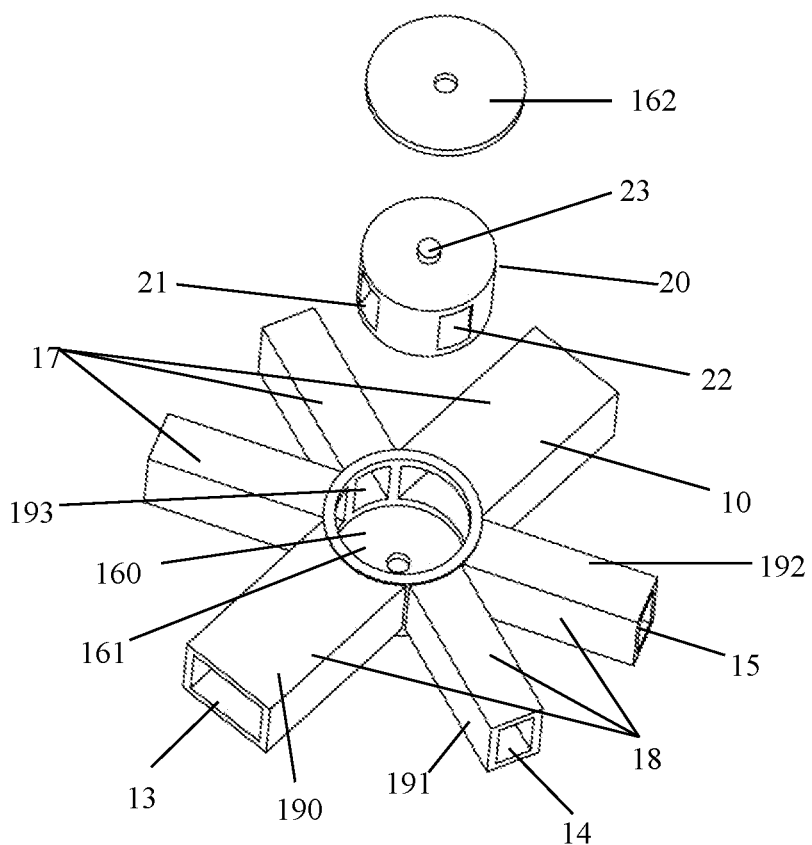
FIG. 2 is an exploded view of the multi-port valve shown in FIG. 1.
Figure 3:
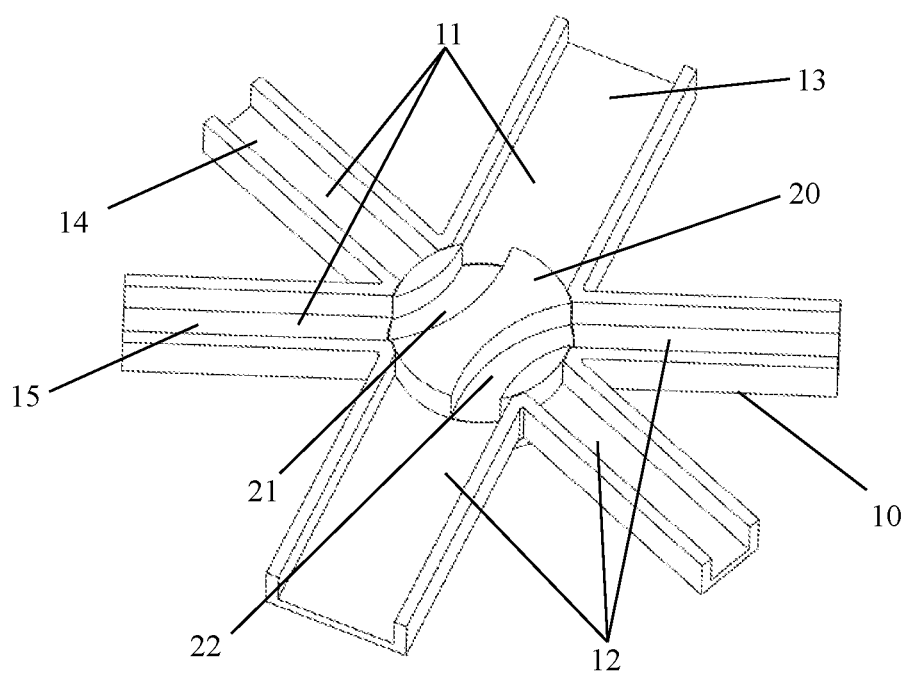
FIG. 3 is a perspective cross-sectional view of the multi-port valve shown in Figure, in which section lines are omitted for simplicity.

Referring to FIGS. 1 to 3, a multi-port valve 100 according to the first embodiment of the present invention includes a valve housing 10 and a valve core 20 rotatably accommodated in the valve housing 10. The valve housing 10 includes total 6 ports, grouped into two port groups 11 and 12 and distributed in a circumferential direction thereof. That is, each port groups 11 or 12 includes a main port 13 and two sub-ports 14/15 arranged in the circumferential direction. The valve core 20 is provided with two flow channels 21 and 22. The two flow channels 21, 22 are configured to communicate the main ports 13 of the respective two port groups 11, 12 with any one of the sub-ports 14/15.

Central angles corresponding to inner openings of all of the sub-ports 14/15 are approximately equal, and a central angle included by an each inner opening of the main ports 13 is approximately equal to a sum of the central angles included by the inner openings of the sub-ports in any one of the port groups 11 or 12. Central angles included by openings at both ends of each of the two flow channels 21 and 22 are not greater than the central angle of each inner openings of the sub-ports.

By rotating the valve core 20, the same one of the flow channels of the valve core 20 can moved to different positions relative to the valve housing 10, so that the said one flow channel 21 or 22 can be communicated with different main ports 13 and/or sub-ports 14/15 at the different positions, so that fluids such as coolant can flow in/out different components correspondingly mating with the different main ports 13 and the sub-ports 14/15 of the valve housing 10 under different work mode as desired.

Since the valve housing 10 of the multi-port valve 100 of the present invention has two port groups 11 and 12, each including a main port 13, a first sub-port 14, and a second sub-port 15 arranged in the circumferential direction, and the valve core 20 has two flow channels 21 and 22, four work modes can be achieved by the cooperation between the valve core 20 and the valve housing 10. That is:

The flow channel 21, one of the two flow channels 21 and 22 communicates with the main port 13 of the port group 11, one of the two port groups 11 and 12, and the first sub-port 14 of said port group 11. The flow channel 22, the other one of the two flow channels 21, 22 communicates with the main port 13 of the port group 12, the other one of the two port groups 11 and 12, and the first sub-port 14 of said port group 12.

The flow channel 21, one of the two flow channels 21 and 22 communicates with the main port 13 of the port group 11, one of the two port groups 11 and 12, and the second sub-port 15 of said port group 11. The flow channel 22, the other one of the two flow channels 21, 22 communicates with the main port 13 of the port group 12, the other one of the two port groups 11 and 12, and the second sub-port 15 of said port group 12.

The flow channel 21, one of the two flow channels 21 and 22 communicates with the main port 13 of the port group 11, one of the two port groups 11 and 12, and the first sub-port 14 of the port group 12, the other one of the two port groups 11 and 12. The flow channel 22, the other one of the two flow channels 21, 22 communicates with the main port 13 of the port group 12, said the other one of the two port groups 11 and 12, and the first sub-port 14 of said port group 11.

The flow channel 21, one of the two flow channels 21 and 22 communicates with the main port 13 of the port group 11, one of the two port groups 11 and 12, and the second sub-port 15 of the port group 12, the other one of the two port groups 11 and 12. The flow channel 22, the other one of the two flow channels 21, 22 communicates with the main port 13 of the port group 12, said the other one of the two port groups 11 and 12, and the second sub-port 15 of said port group 11.

In this embodiment, the valve housing 10 includes a cylindrical central hub 16, and a first flow guide arm group 17 and a second flow guide arm group 18 distributed along a circumferential direction of the central hub 16. The central hub 16 has an accommodating cavity 160, and the valve core 20 is accommodated in the accommodating cavity 160 of the central hub 16 with a dynamic sealing mechanism therebetween. Preferably, the central hub 16 includes a hollow support cup 161 that is open at one end in the axial direction and closed at the other end in the axial direction, and a cover 162 that is detachably covered with the end opening of the support cup 161. The first port group 11 and the second port group 12 are respectively formed by the first flow guide arm group 17 and the second flow guide arm group 18. Specifically, each of the first flow guide arm group 17 and the second flow guide arm group 18 includes a main arm 190, a first sub-arm 191, and a second sub-arm 192. The main flow arm 190, the first sub arm 191, and the second sub arm 192 respectively defines a radially extending through hole 193 therein. All the through holes 193 are communicated with the receiving cavity 160 of the central hub 16 to form the main ports 13, the first sub-ports 14 and the second sub-ports 15 of the port group 11 and the second port group 12 respectively. Preferably, the main ports 13, the first sub-ports 14 and the second sub-ports 15 of the first port group 11 and the second port group 12 are located in the same horizontal plane. More preferably, the first port group 11 and the second port group 12 are symmetrical with each other. Also preferably, the central angles corresponding to the first sub-ports 14 are approximately equal to the central angle corresponding to the second sub-ports 15. The central angle corresponding to each of the main ports 13 is approximately equal to a sum of the central angles corresponding to one of the first sub-ports 14 and one of the second sub-ports 15. In this embodiment, the central angles corresponding to the first sub-port 14 and the central angles corresponding to the second sub-port 15 are approximately 30 degrees. The central angles corresponding to each of the main ports 13 is approximately 60 degrees.

In this embodiment, the valve core 20 is cylindrical with the first flow channel 21 and the second flow channel 22 defined therein. The first flow channel 21 extends laterally from one side of the outer peripheral wall of the valve core 20 to the other side of the outer peripheral wall of the valve core 20 in an arcuate shape. Preferably, a middle of the first flow channel 21 is closer to a centre of the valve core 20 than the two ends thereof. Similarly, the second flow channel 22 extends laterally from one side of the outer peripheral wall of the valve core 20 to the other side of the outer peripheral wall of the valve core 20 in an arcuate shape. Preferably, a middle of the second flow channel 22 is closer to the centre of the valve core 20 than the two ends thereof. More preferably, the first flow channel 21 and the second flow channel 22 are symmetrical with respect to the centre of the valve core 20. Also preferably, the first flow channel 21, the second flow channel 22, the main port 13, the first sub-port 14, and the second sub-port 15 of the aforementioned first port group 11 and the second port group 12 are located at in the same horizontal plane. More preferably, central angles of openings the first flow channel 21 and the second flow channel 22, are respectively equal to that of the first sub-port 14 and the second sub-port 15 of the first and second port groups 11. So that the first flow channel 21 or the second flow channel 22 can completely aligned with the first sub-port 14 or the second sub-port 15 of the first port group 11 or the second port group 12. Also preferably, a central angle of an opening of at each of both ends of the first flow channel 21 and the second flow channel 22 is less than or equal to a half of that of each of the main ports 13 of the first and second port groups 11, 12, Therefore, it is ensured that the first flow channel 21 and the second flow channel 22 can be aligned with the corresponding main port 13 when the rotor core 20 is rotated to two different positions.

In this embodiment, the valve core 20 further includes a drive shaft 23 running through the centre thereof. One of opposite ends of the drive shaft 23 extends out of one of opposite axial ends of the valve core 20 and the cover 162. The other end of the drive shaft 23 extends out of the other axial end of the valve core 20, and the support cup 161, to be connected to a drive mechanism to drive the valve core 20 to rotate relative to the valve housing 10.

In assembly of the multi-port valve 100, the valve core 20 is placed into the support cup 161 first, and then the cover 162 is fixed to the support cup 161 with sealing therebetween. It can be understood that, in other embodiments, the valve housing 10 and the valve core 20 can also be overmolded. In other words, the valve housing 10 can be formed as a single piece to accommodating the valve core 20.

Different work modes of the multi-port valve 100 of this embodiment and its applications in the thermal management system for vehicles are described below.

Figure 4A:
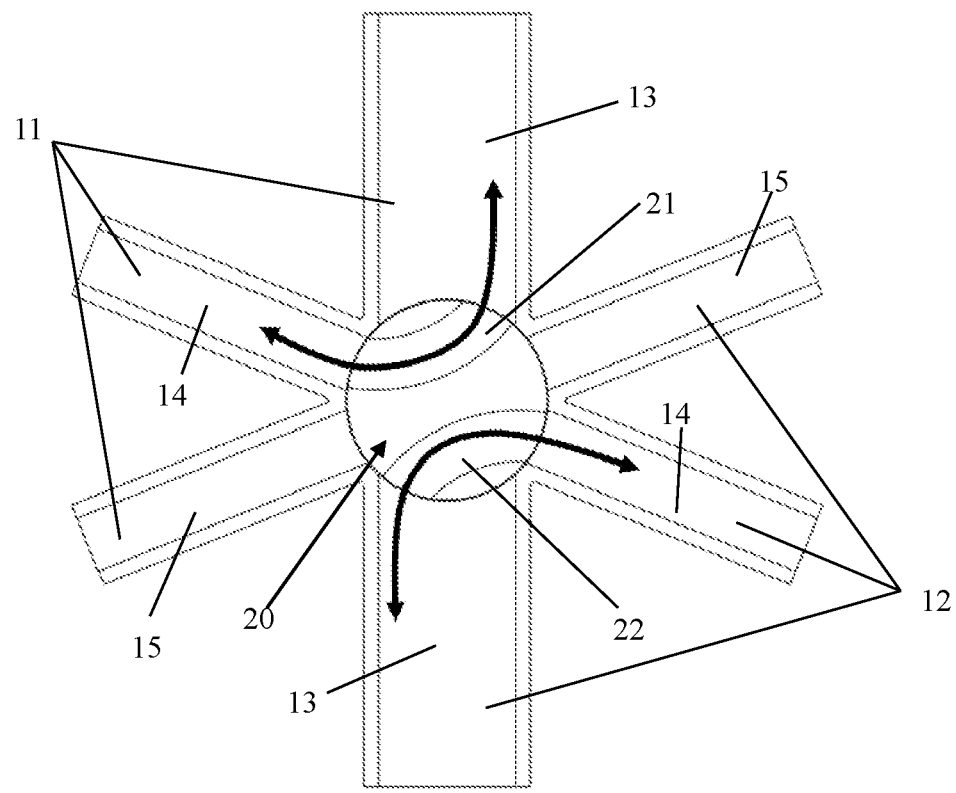
FIG. 4A is a top cross-sectional view of the multi-port valve shown in FIG. 1 in a first work mode, and the hatching is omitted for simplicity.

Referring to FIG. 4A, in the first work mode of the multi-port valve 100 of the present embodiment, the valve core 20 is rotated to a desired position so that the first flow channel 21 of the multi-port valve 100 communicates the main port 13 of the first port group 11 with the first sub-port 14 of the first port group 11. The second flow channel 22 communicates the main port 13 of the second port group 12 with the first sub-port 14 of the second port group 12.

Figure 4B:
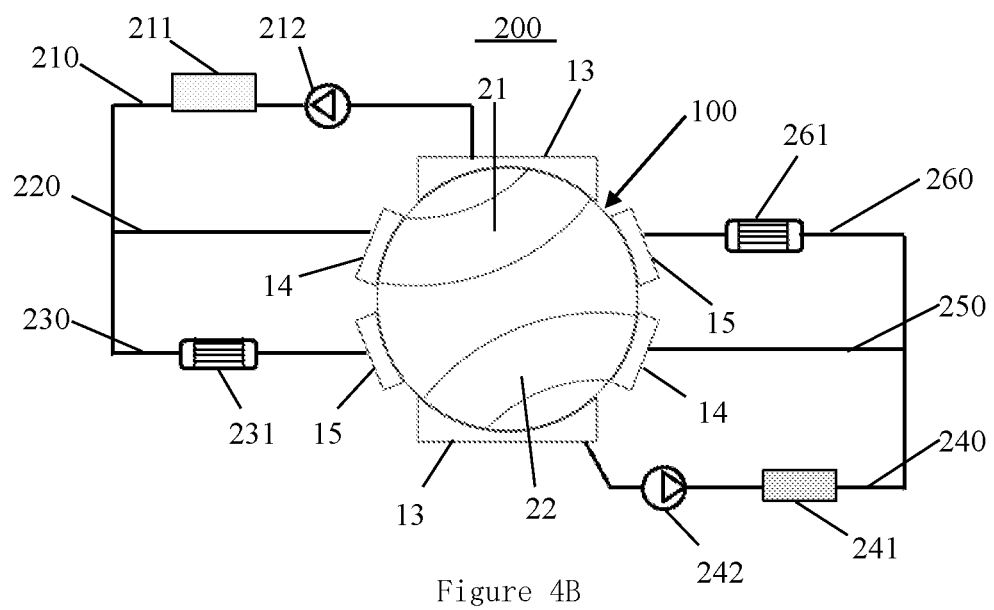
FIG. 4B is a schematic diagram of a thermal management system including the multi-port valve shown in FIG. 4A.

Referring to FIG. 4B, a thermal management system 200 for vehicle according to an embodiment of the present invention includes the multi-port valve 100, and a plurality of coolant branches connected to corresponding ports of the multi-port valve 100. The plurality of coolant branches includes an ED (electric drive) cooling branch 210, a first common branch 220, a radiator branch 230, a battery heat managing branch 240, a second common branch 250, and the chiller branch 260. a first end of the ED cooling 210 is connected to the main port 13 of the first port group 11 of the multi-port valve 100. A first end of the first common branch 220 is connected to the first sub-port 14 of the first port group 11 of the multi-port valve. A first end of the radiator branch 230 is connected to the second sub-port 15 of the first port group 11 of the multi-port valve 100. A first end of the battery heat managing branch 240 is connected to the main port 13 of the second port group 12 of the multi-port valve 100. A first end of the second common branch 250 is connected to the first sub-port 14 of the second port group 12 of the multi-port valve 100. A first end of the chiller branch 260 is connected to the second sub-port 15 of the second port group 12 of the multi-port valve 100. An electric driver 211 and a first pump 212 for coolant driving are arranged in the ED cooling branch 210. The electric drive 211 typically includes a traction motor and an electric control unit. A radiator 231 is arranged in the radiator branch 230. Second ends of the first common branch 220, the ED cooling branch 210 and the radiator branch 230 are interconnected. A battery 241 and a second pump 242 for coolant driving are arranged in the battery heat managing branch 240. A chiller 261 is arranged in the chiller branch 260. Second ends of the second common branch 250, the battery heat managing branch 240 and the chiller branch 260 are interconnected.

When the multi-port valve 100 works on a first work mode, as described above, the first flow channel 21 of the multi-port valve 100 communicates the main port 13 of the first port group 11 with the first sub-port 14 of the first port group 11. The ED cooling branch 210 and the first common branch 220 are connected in series to form a closed loop via the first flow channel 21 of the multi-port valve 100. Therefore, the coolant flows through the electric drive 211 under the action of the first pump 212. Here, the coolant can absorb heat from the electric drive 211. At the same time, the second flow channel 22 communicates with the main port 13 of the second port group 12 and the first sub-port 14 of the second port group 12. The battery heat managing branch 240 and the second common branch 250 are connected in series to form a closed loop via the second flow channel 22 of the multi-port valve 100. Then, the coolant flows through flows through the battery 241 under the action of the second pump 242. At this work mode, the coolant does not exchange heat with the radiator 231 or the chiller 261.

Figure 5A:
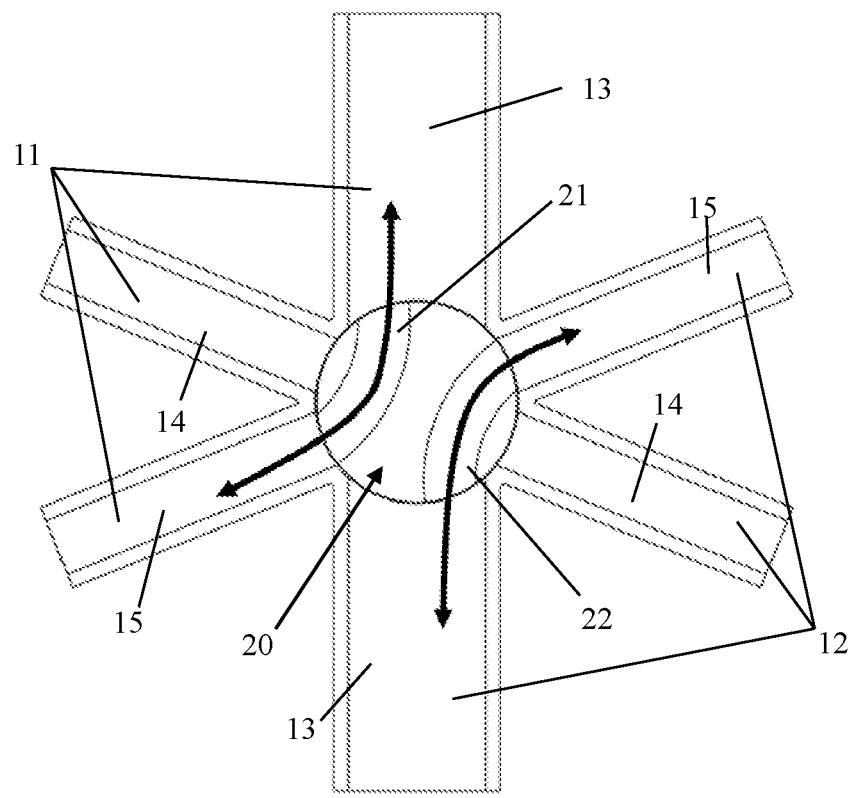
FIG. 5A is a top cross-sectional view of the multi-port valve shown in FIG. 1 in a second work mode, and the hatching is omitted for simplicity.
Figure 5B:
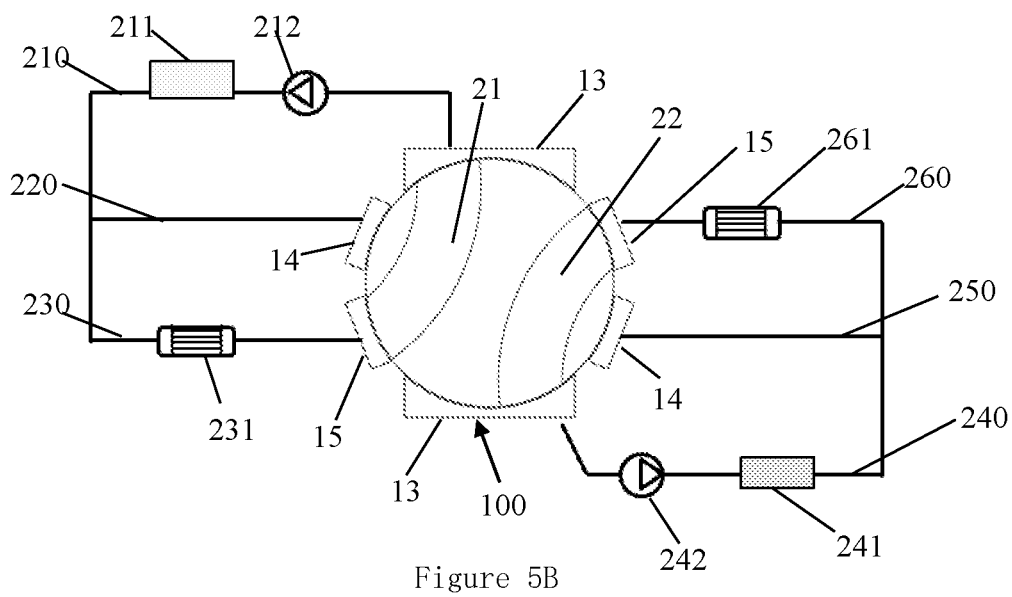
FIG. 5B is a schematic diagram of a thermal management system including the multi-port valve shown in FIG. 5A.

Referring to FIGS. 5A and 5B, when the multi-port valve 100 works on a second work mode, the first flow channel 21 of the multi-port valve 100 communicates with the main port 13 of the first port group 11 and the second sub-port 15 of the first port group 11. The ED cooling branch 210 and the radiator branch 230 are connected in series via the first flow channel 21 of the multi-port valve 100 to form a closed loop. Then, the coolant flows through the radiator 231 under the action of the first pump 212 for heat exchanging and cooling the electric drive 211. At the same time, the second flow channel 22 communicates with the main port 13 of the second port group 12 and the second sub-port 15 of the second port group 12. Then, the battery heat managing branch 240 and the chiller branch 260 are connected in series to form a closed loop via the second flow channel 22 of the multi-port valve 100. The coolant flows through the chiller 261 under the action of the second pump 242 for heat exchanging and cooling the battery 241.

Figure 6A:
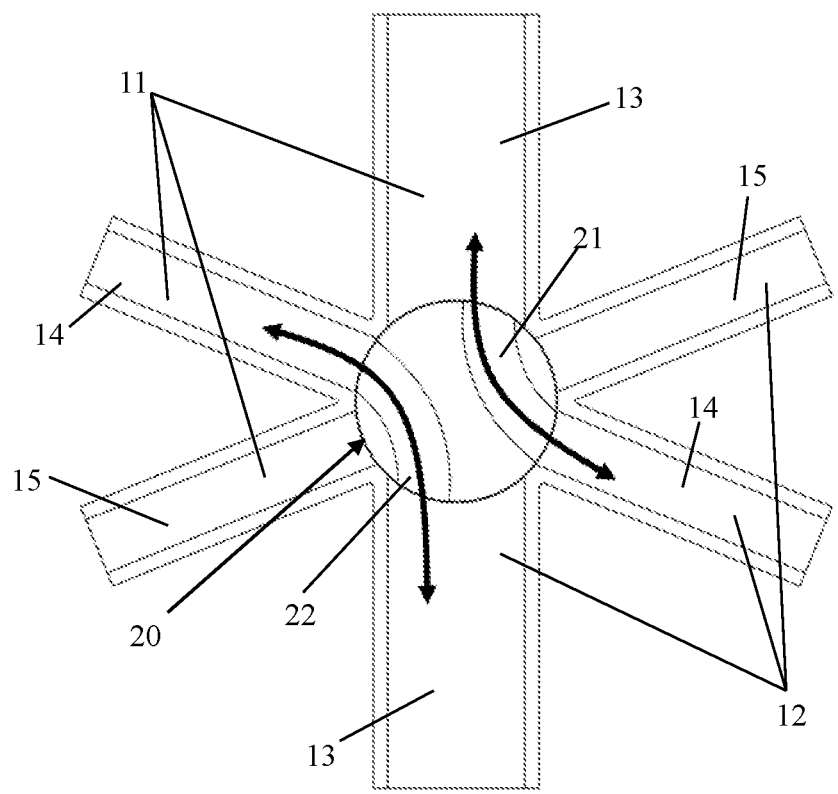
FIG. 6A is a top cross-sectional view of the multi-port valve shown in FIG. 1 in a third work mode, and the hatching is omitted for simplicity.
Figure 6B:
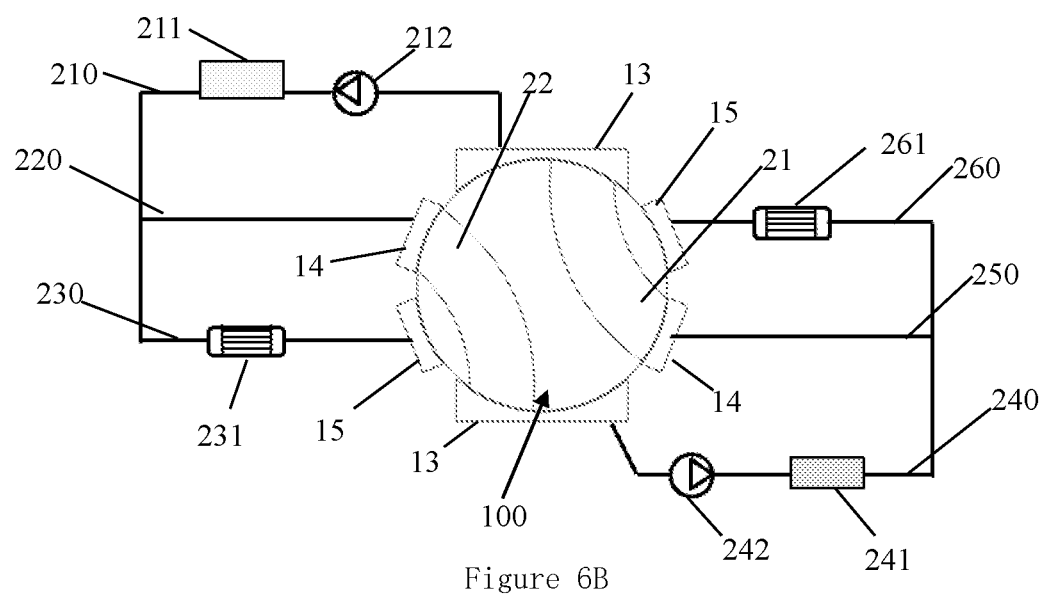
FIG. 6B is a schematic diagram of a thermal management system including the multi-port valve shown in FIG. 6A.

Referring to FIGS. 6A and 6B, when the multi-port valve 100 works on a third work mode, the first flow channel 21 of the multi-port valve 100 communicates with the main port 13 of the first port group 11 and the first sub-port 14 of the second port group 12, and the second flow channel 22 communicates with the main port 13 of the second port group 12 and the first sub-port 14 of the first port group 11. Them, the ED cooling branch 210, the first common branch 220, and the battery heat managing branch 240 and the second common branch 250 are connected in series to form a closed loop via the first flow channel 21 and the second flow channel 22 of the multi-port valve 100. The coolant flows through the electric drive 211 and the battery 241 under the action of the first pump 212 and the second pump 214, without exchanging heat with the radiator 231 or the chiller 261. Here, the coolant may help to transfer heat from the electric drive 211 to the battery 241 to heat the battery 241.

Figure 7A:
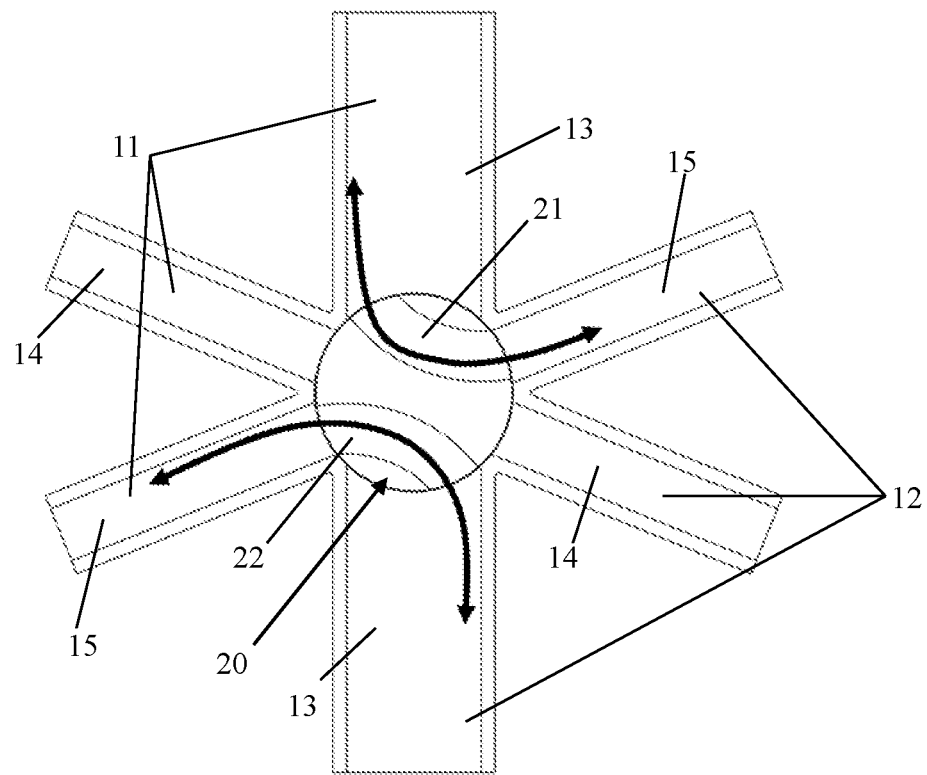
FIG. 7A is a top cross-sectional view of the multi-port valve shown in FIG. 1 in a fourth work mode, and the hatching has been omitted for simplicity.
Figure 7B:
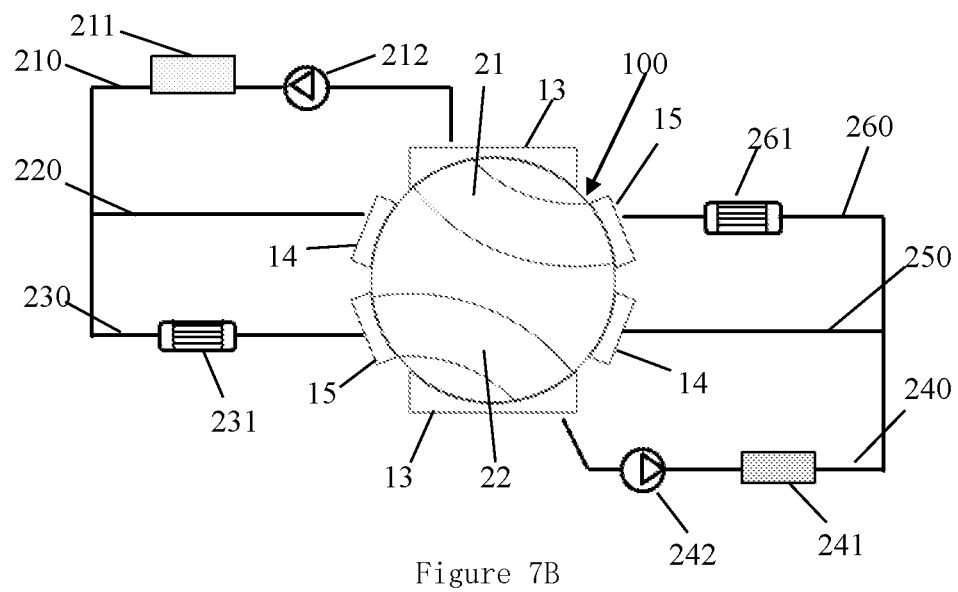
FIG. 7B is a schematic diagram of a thermal management system including the multi-port valve shown in FIG. 7A.

Referring to FIGS. 7A and 7B, when the multi-port valve 100 works on the fourth work mode, the first flow channel 21 of the multi-port valve 100 communicates with the main port 13 of the first port group 11 and the second sub-port 15 of the second port group 12, and the second flow channel 22 communicates with the main port 13 of the second port group 12 and the second sub-port 15 of the first port group 11. Then, the ED cooling branch 210, the radiator branch 230, the battery heat managing branch 240 and the chiller branch 260 are connected in series via the first flow channel 21 and the second flow channel 22 of the multi-port valve 100. Under the action of the first pump 212 and the second pump 242, the coolant flows through the radiator 231 and the chiller 261 for heat exchanging and then cooling the electric drive 211 and the battery 241.

It should be noted that the components (ED 211, battery 241, radiator 231, and chiller 261) in the above-mentioned thermal management system 200 for vehicle are only shown as examples, without any limitation to the thermal management system 200 of the present invention. In other embodiments, the multi-port valve 100 may also be used in thermal management systems including other automotive components. Furthermore, the multi-port valve 100 can also be used in other thermal management systems with heat exchanging.

Figure 8:
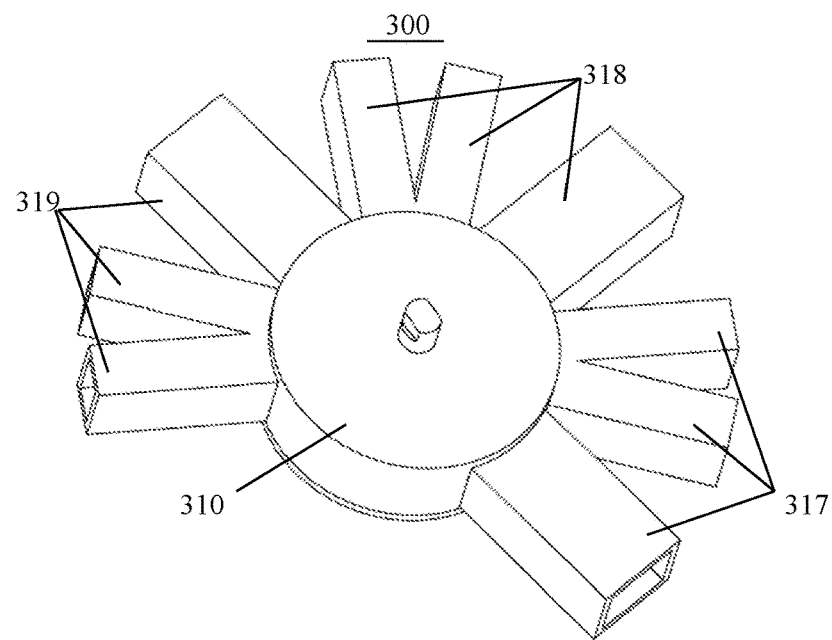
FIG. 8 is a perspective view of a multi-port valve according to a second embodiment of the present invention.
Figure 9:
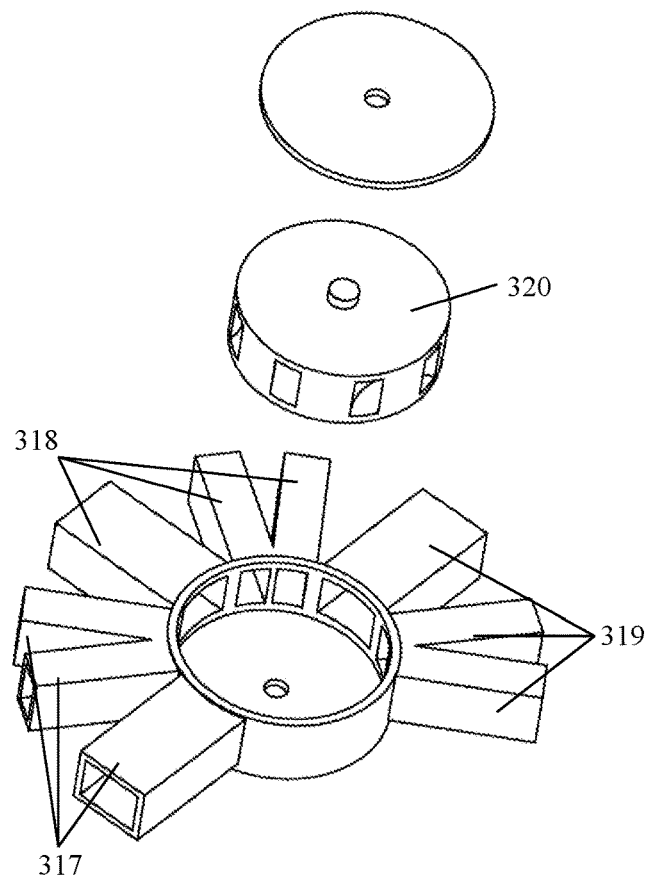
FIG. 9 is an exploded view of the multi-port valve shown in FIG. 8.
Figure 10:
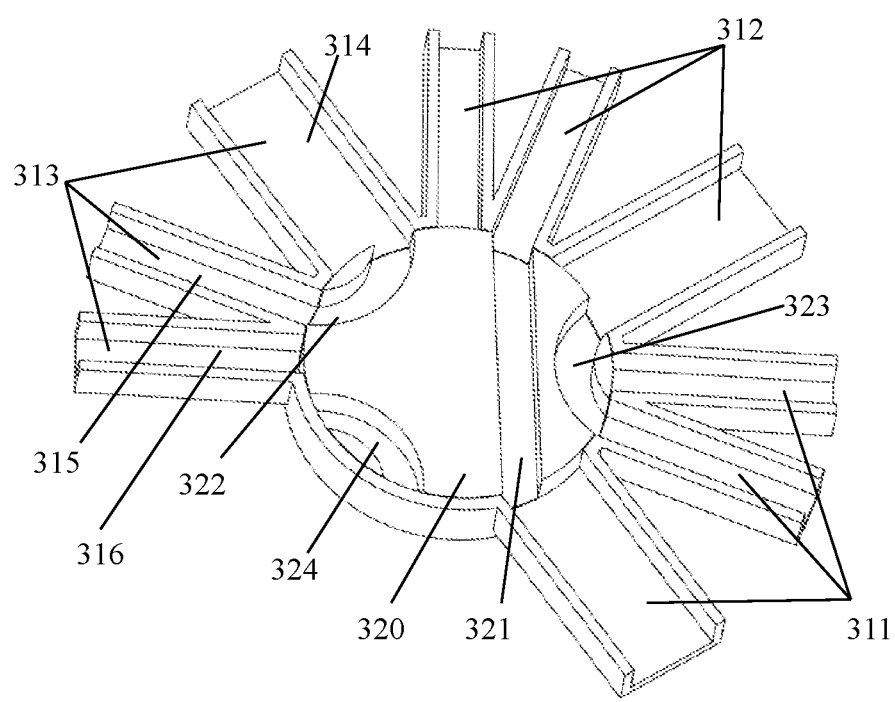
FIG. 10 is a perspective cross-sectional view of the multi-port valve shown in FIG. 8, with hatching omitted for simplicity.

Referring FIGS. 8 to 10, a multi-port valve 300 of a second embodiment of the present invention is similar to the multi-port valve 100 of the first embodiment of the present invention, the same parts will not be repeated here, and the main difference between the two is number of the flow channels and port groups, and thus work modes of the multi-port.

Specifically, the valve housing 310 of the multi-port valve 300 in this embodiment is provided with three flow guide arm group, i.e., a first flow guide arm group 317, a second flow guide arm group 318, and a third flow guide arm group 319 arranged in sequence along a circumferential direction. Correspondingly, there are three port groups, i.e., a first port group 311, a second port group 312, and a third port group 313 arranged in sequence along the circumferential direction. The valve core 20 is provided with four flow channels, i.e., a first flow channel 321, a second flow channel 322, a third flow channel 323, and a fourth flow channel 324. Preferably, the first port group 311 and the third port group 313 are centre-symmetrical with each other. More preferably, the second port group 312 is located in the circumferential middle of the first port group 311 and the third port group 313. In this embodiment, a central angle included by each of first sub-ports 315 and second sub-ports 316 is approximately 20 degrees. A central angle included by each of main ports 314 is approximately 40 degrees.

Preferably, the first flow channel 321 is straight, and transversely extends the valve core 320 from one side of an outer peripheral wall of the valve core 320 to the other side thereof. Further, the first flow channel 321 is deviated from a centre of the valve core 320. Preferably, the second flow channel 322, the third flow channel 323, and the fourth flow channel 324 are arcuate-shaped, and respectively extend through the outer peripheral wall of valve core 320. Preferably, a middle portion of each of the second flow channel 322, the third flow channel 323, and the fourth flow channel 324 is closer to the centre of the valve core 320 than the respective two ends thereof. Preferably, the second flow channel 322 and the fourth flow channel 324 are located at the same side of the first flow channel 321, and the third flow channel 323 is located at a side of the first flow channel 321 opposite to the second flow channel 322.

Different working mode of the multi-port valve 300 of this embodiment and its applications in the thermal management system for vehicles are described below.

Figure 11A:
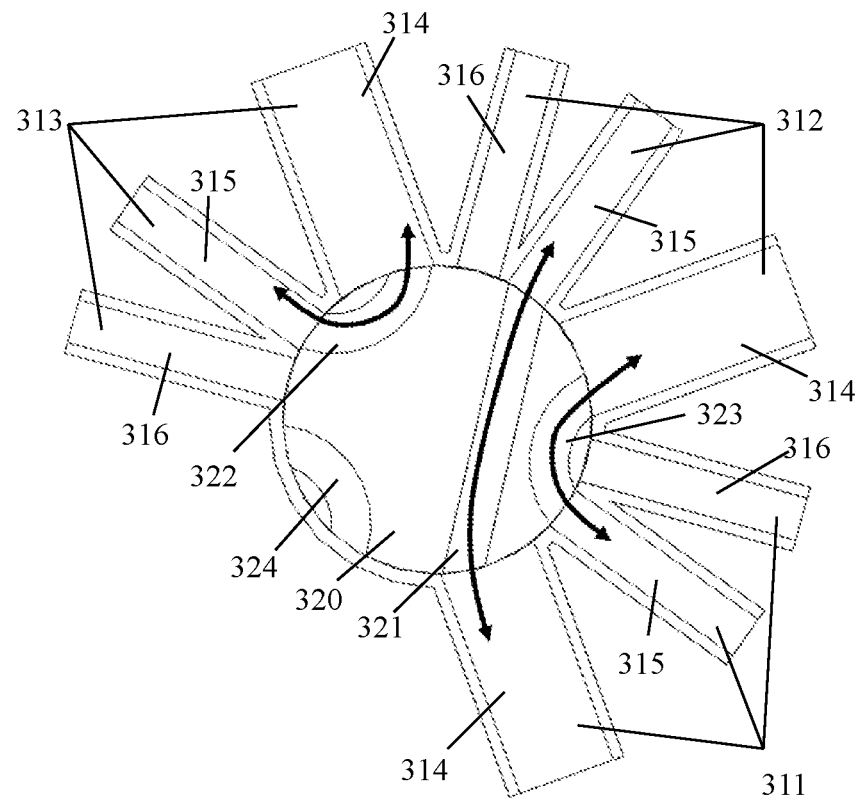
FIG. 11A is a top cross-sectional view of the multi-port valve shown in FIG. 8 in a first work mode, and the hatching is omitted for simplicity.

Referring to FIG. 11A, in a first work mode of the multi-port valve 300 of this embodiment, the valve core 320 is rotate to a desired position so that the first flow channel 321 thereof communicates the main port 314 of the first port group 311 with the first sub-port 315 of the second port group 312. The second flow channel 322 communicates the main port 314 of the port group 313 with the first sub-port 315 of the third port group 313. The third flow channel 323 communicates the main port 314 of the second port group 312 with the first sub-port 315 of the first port group 311. The fourth flow channel 324 is idle, that is, not in communication with any port.

Figure 11B:
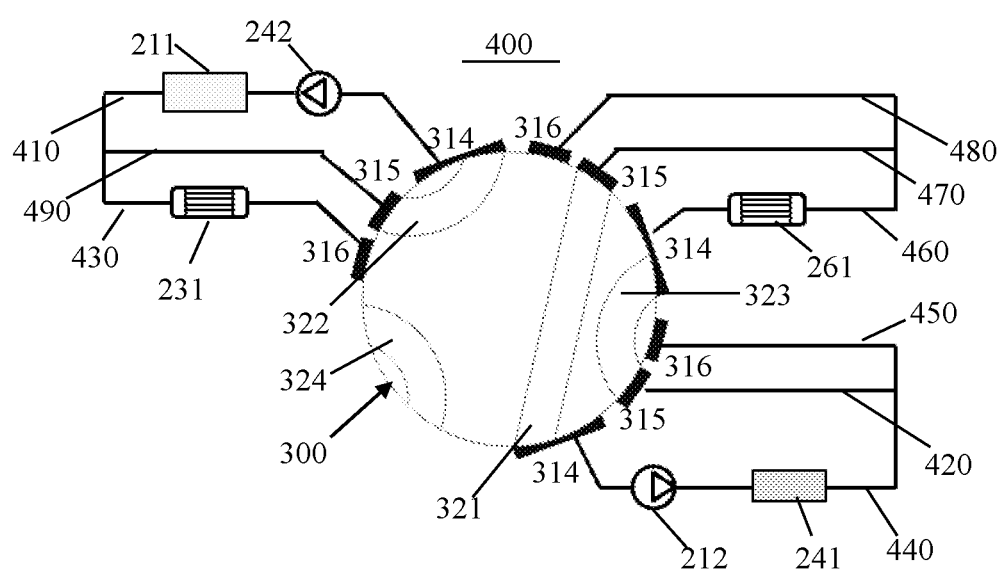
FIG. 11B is a schematic diagram of a thermal management system including the multi-port valve shown in FIG. 11A.

Referring to FIG. 11B, a thermal management system 400 for vehicle according to an embodiment of the present invention includes the multi-port valve 300 according to the second embodiment of the present invention, a battery heat managing branch 440, a chiller branch 460, an ED cooling branch 410, a radiator branch 430, a first common branch 420, a second common branch 450, a third common branch 470, a forth common branch 480, and the fifth common branch 490 are respectively connected to ports of the multi-port valve 300. A first end of the battery heat managing branch 440 communicates with the main port 314 of the first port group 311 of the multi-port valve 300. A first end of the first common branch 420 communicates with the first sub-port 315 of the first port group 311 of the multi-port valve 300. A first end of the second common branch 450 communicates with the second sub-port 316 of the first port group 311 of the multi-port valve 300. A first end of the chiller branch 460 communicates with the main port 314 of the second port group 312 of the multi-port valve 300. A first end of the third common branch 470 communicates with the first sub-port 315 of the second port group 312 of the multi-port valve 300. A first end of the fourth common branch 480 communicates with the second sub-port 316 of the second port group 312 of the multi-port valve 300. A first end of the ED cooling branch 410 communicates with the main port 314 of the third port group 313 of the multi-port valve 300. A first end of the fifth common branch 490 communicates with the first sub-port 315 of the third port group 313 of the multi-port valve 300. A first end of the radiator branch 430 communicates with the second sub-port 316 of the third port group 313 of the multi-port valve 300.

The battery 241 and the first pump 212 for coolant driving are arranged in the battery heat managing branch 440. Second ends of the first common branch 420, the second common branch 450, and the battery heat managing branch 440 are interconnected. The chiller 261 is arranged in the chiller branch 460. Second ends of the third common branch 470, the fourth common branch 480, and the chiller branch 460 are interconnected. The electric drive 211 and the second pump 242 for coolant driving are arranged in the ED cooling branch 410. The radiator 231 is arranged in the radiator branch 430. Second ends of the fifth common branch 490, the ED cooling branch 410 and the radiator branch 430 are interconnected.

When the multi-port valve 300 works on the first work mode, as described above, the first flow channel 321 of the multi-port valve 300 communicates the main port 314 of the first port group 311 with the first sub-port 315 of the second port group 312. The third flow channel 323 communicates the main port 314 of the second port group 312 with the first sub-port 315 of the first port group 311. Thus, the battery heat managing branch 440, the first common branch 420, and the chiller branch 460, and the third common branch 470 are connected in series to form a closed loop via the first flow channel 321 and the third flow channel 323 of the multi-port valve 300. Under the action of the first pump 212, the coolant flows through the chiller 261 for heat exchanging and then cooling the battery 241. At the same time, the second flow channel 322 communicates the main port 314 of the third port group 313 with the first sub-port 315 of the third port group 313. Thus, the ED cooling branch 410 and the fifth common branch 490 are connected in series to form a closed loop via the second flow channels 322 of the multi-port valve 300. Under the action of the second pump 242, the coolant flows through the electric drive 211 without heat exchanging with the radiator 231.

Figure 12A:
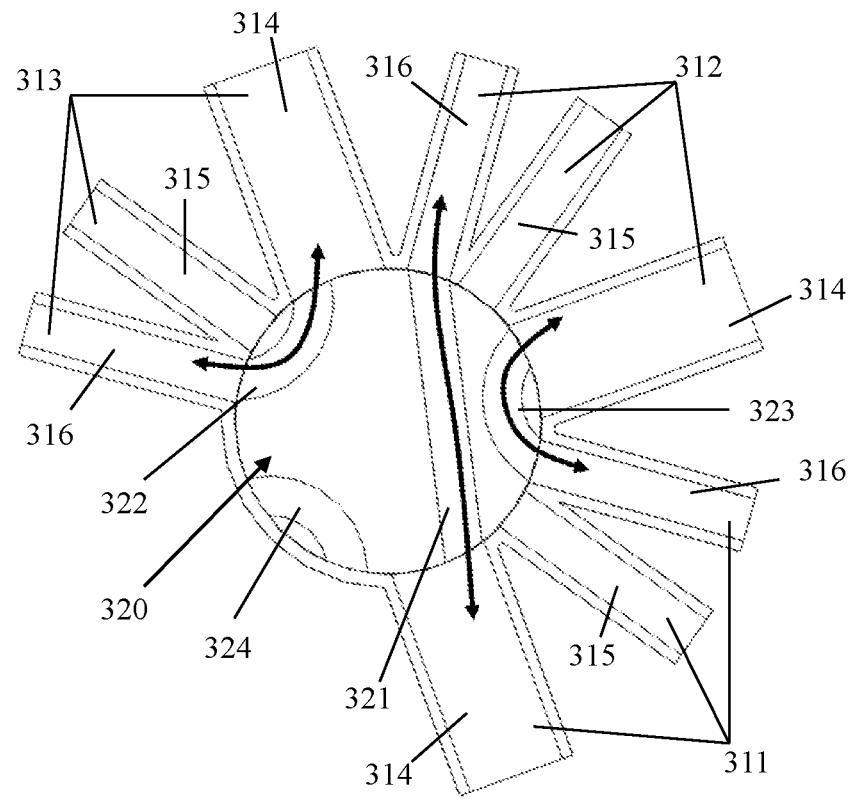
FIG. 12A is a top cross-sectional view of the multi-port valve shown in FIG. 8 in a second work mode, and the hatching has been omitted for simplicity.
Figure 12B:
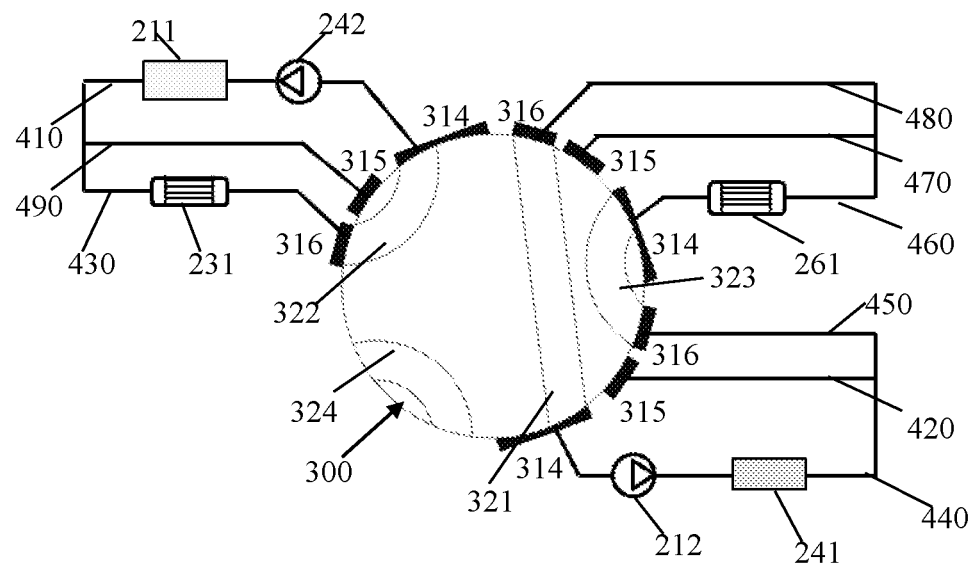
FIG. 12B is a schematic diagram of a thermal management system including the multi-port valve shown in FIG. 12A.

Referring to FIGS. 12A and 12B, when the multi-port valve 300 works on a second work mode, the first flow channel 321 communicates the main port 314 of the first port group 311 with the second sub-port 316 of the second port group 312, and the third flow channel 323 communicates the main port 314 of the second port group 312 with the second sub-port 316 of the first port group 311. Thus, the battery heat managing branch 440, the second common branch 450, the chiller branch 460, and the fourth common branch 480 are connected in series form a closed loop via the first flow channel 321 and the third flow channel 323 of the multi-port valve 300. Under the action of the first pump 212, the coolant flows through the chiller 261 for heat exchanging and then cooling the battery 241. At the same time, the second flow channel 322 communicates the main port 314 of the third port group 313 with the second sub-port 316 of the third port group 313. Thus, the ED cooling branch 410 and the radiator branch 430 are connected in series to form a closed loop via the second flow channels 322 of the multi-port valve 300. Under the action of the second pump 242, the coolant flows through the radiator 231 for heat exchanging therebetween and then cooling the electric drive 211.

Figure 13A:
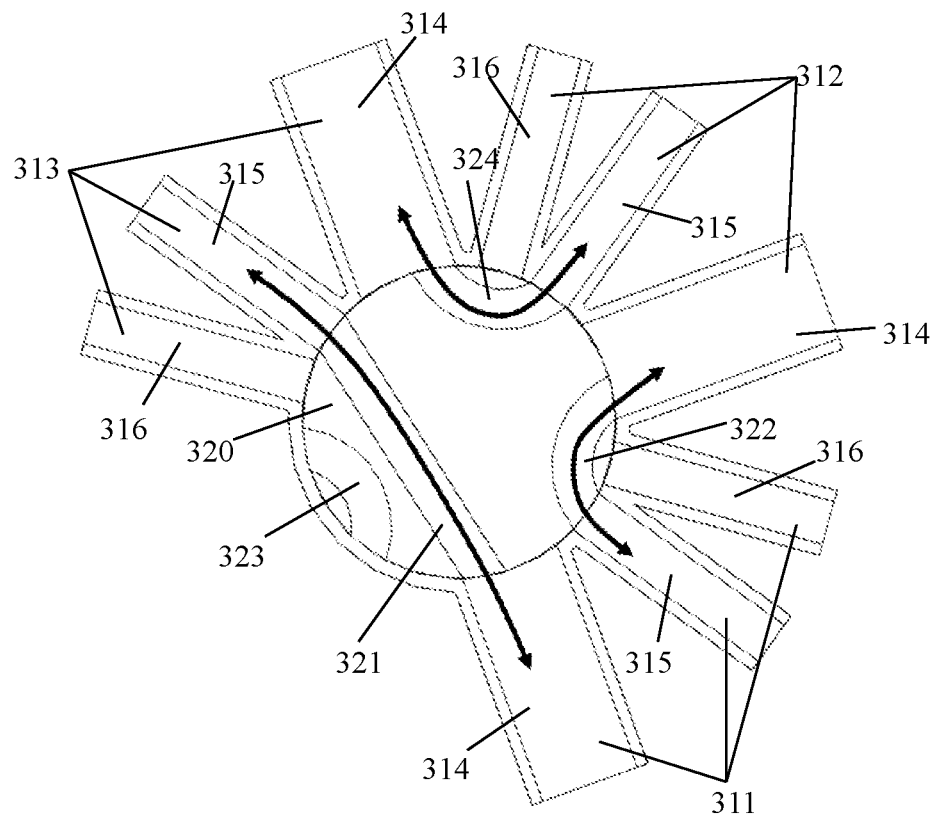
FIG. 13A is a top cross-sectional view of the multi-port valve shown in FIG. 8 in a third work mode, and the hatching is omitted for simplicity.
Figure 13B:
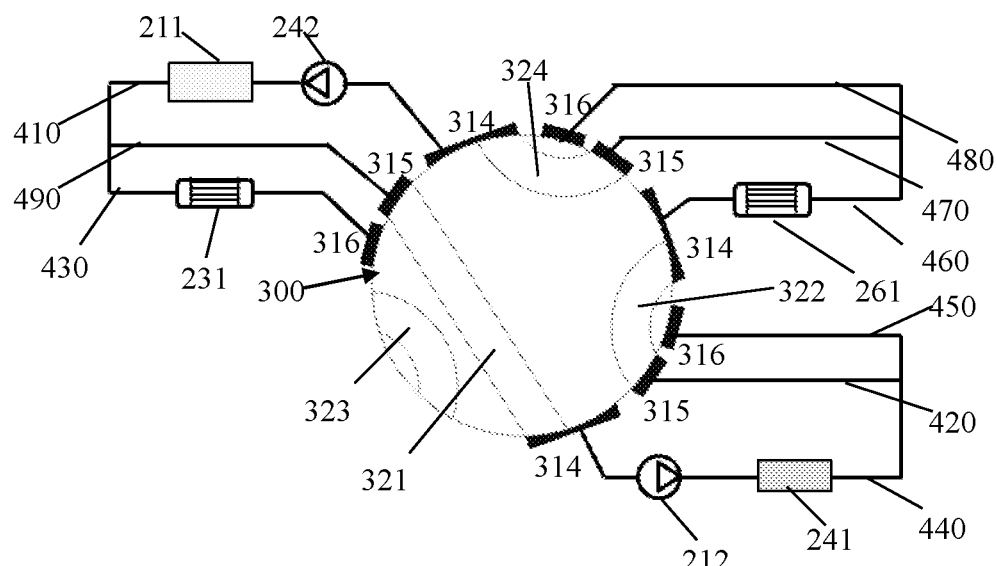
FIG. 13B is a schematic diagram of a thermal management system including the multi-port valve shown in FIG. 13A.

Referring to FIGS. 13A and 13B, when the multi-port valve 300 works on a third work mode, the first flow channel 321 communicates the main port 314 of the first port group 311 with the first sub-port 315 of the third port group 313; the second flow channel 322 communicates the main port 314 of the second port group 312 with the first sub-port 315 of the first port group 311; and the fourth flow channel 324 communicates the main port 314 of the third port group 313 with the first sub-port 315 of the second port group 312. Thus, the first common branch 420 and the chiller branch 460 are in fluid communication with each other via the second flow channel 322; the third common branch 470 and the ED cooling branch 410 are in fluid communication with each other via the fourth flow channel 324; and the fifth common branch 490 and the battery heat managing branch 440 are in fluid communication with each other the first flow channel 32. Under the action of the first pump 212 and the second pump 242, the coolant flows through the chiller 261 for heat exchanging therebetween and then cooling the battery 241 and the electric drive 211.

Figure 14A:
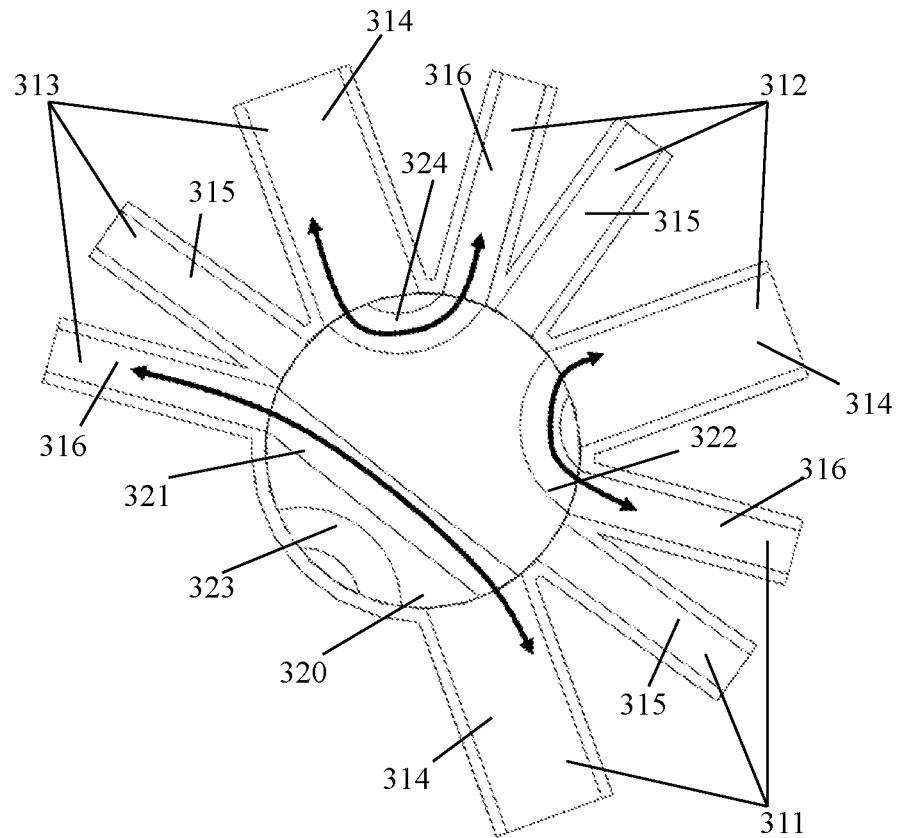
FIG. 14A is a top cross-sectional view of the multi-port valve shown in FIG. 8 in a fourth work mode, and the hatching has been omitted for simplicity.
Figure 14B:
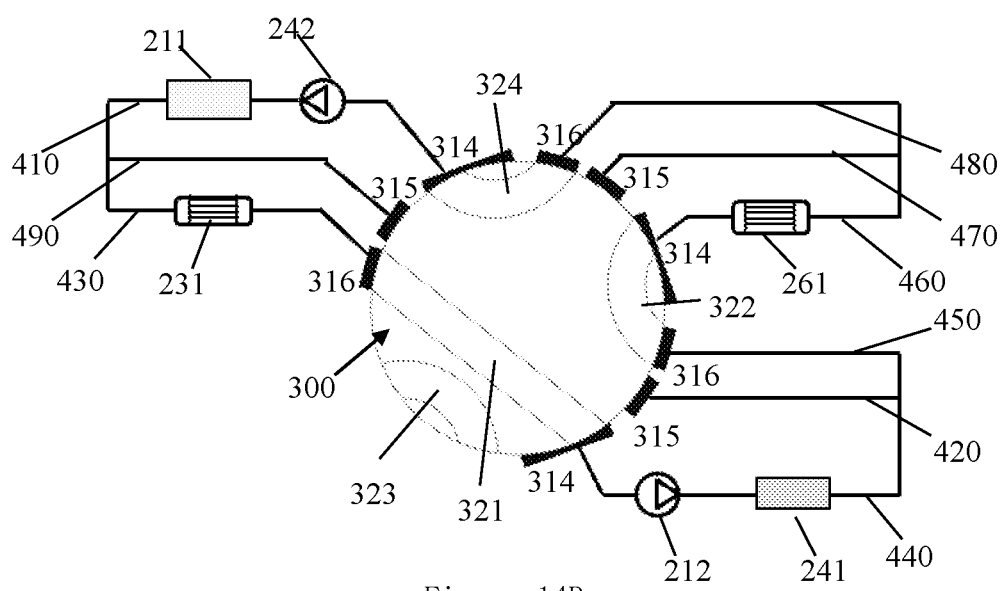
FIG. 14B is a schematic diagram of a thermal management system including the multi-port valve shown in FIG. 14A.

Referring to FIGS. 14A and 14B, when the multi-port valve 300 works on a fourth work mode, the first flow channel 321 communicates the main port 314 of the first port group 311 with the second sub-port 316 of the third port group 313; the second flow channel 322 communicates the main port 314 of the second port group 312 with the second sub-port 316 of the first port group 311; and the fourth flow channel 324 communicates the main port 314 of the third port group 313 with the second sub-port 316 of the second port group 312. Thus, the second common branch 450 and the chiller branch 460 are in fluid communication with each other via the second flow channel 322; the fourth common branch 480 and the ED cooling branch 410 are in fluid communication with each other via the fourth flow channel 324; and the chiller branch 430 and the battery heat managing branch 440 are fluid communication with each other via the first flow channel 321. Under the action of the first pump 212 and the second pump 242, the coolant flows through the chiller 261 and the radiator 231 for heat exchanging therebetween and then cooling the battery 241 and the electric drive 211.

Figure 15A:
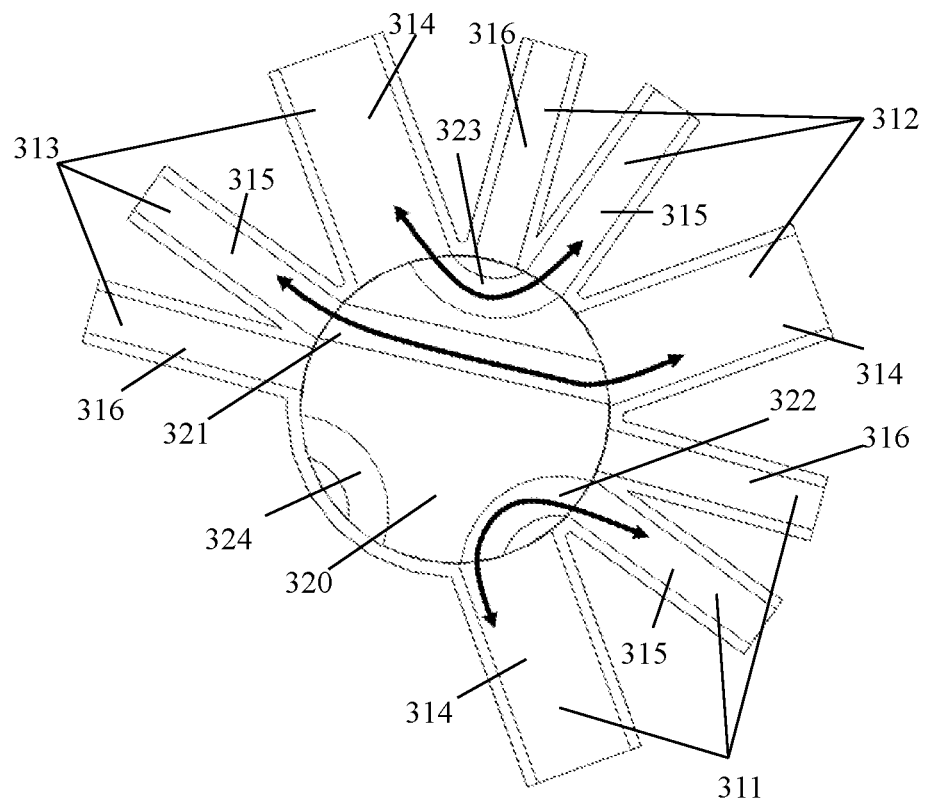
FIG. 15A is a top cross-sectional view of the multi-port valve shown in FIG. 8 in a fifth work mode, and the hatching has been omitted for simplicity.
Figure 15B:
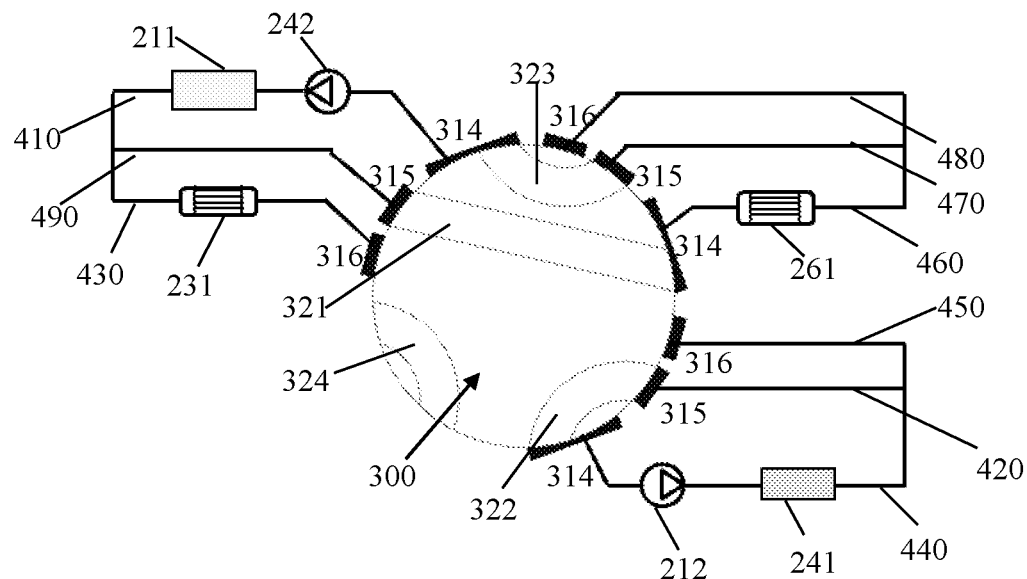
FIG. 15B is a schematic diagram of a thermal management system including the multi-port valve shown in FIG. 15A.

Referring to FIGS. 15A and 15B, when the multi-port valve 300 works on a fifth work mode, the first flow channel 321 communicates the main port 314 of the second port group 312 with the first sub-port 315 of the third port group 313; and the third flow channel 323 communicates the main port 314 of the third port group 313 with the first sub-port 315 of the second port group 312. Thus, the third common branch 470 and the ED cooling branch 410 are in fluid communication with each other via the third flow channel 323; and the fifth common branch 490 and the chiller branch 460 are in fluid communication with each other via the first flow channel 321. Under the action of the second pump 242, the coolant flows through the chiller 261 for heat exchanging therebetween and then cooling the electric drive 211. At the same time, the fourth flow channel 324 communicates the main port 314 of the first port group 311 with the first sub-port 315 of the first port group 311. Under the action of the first pump 212, the coolant flows through the battery 241 to cool it without heat exchanging with the radiator 231.

Figure 16A:
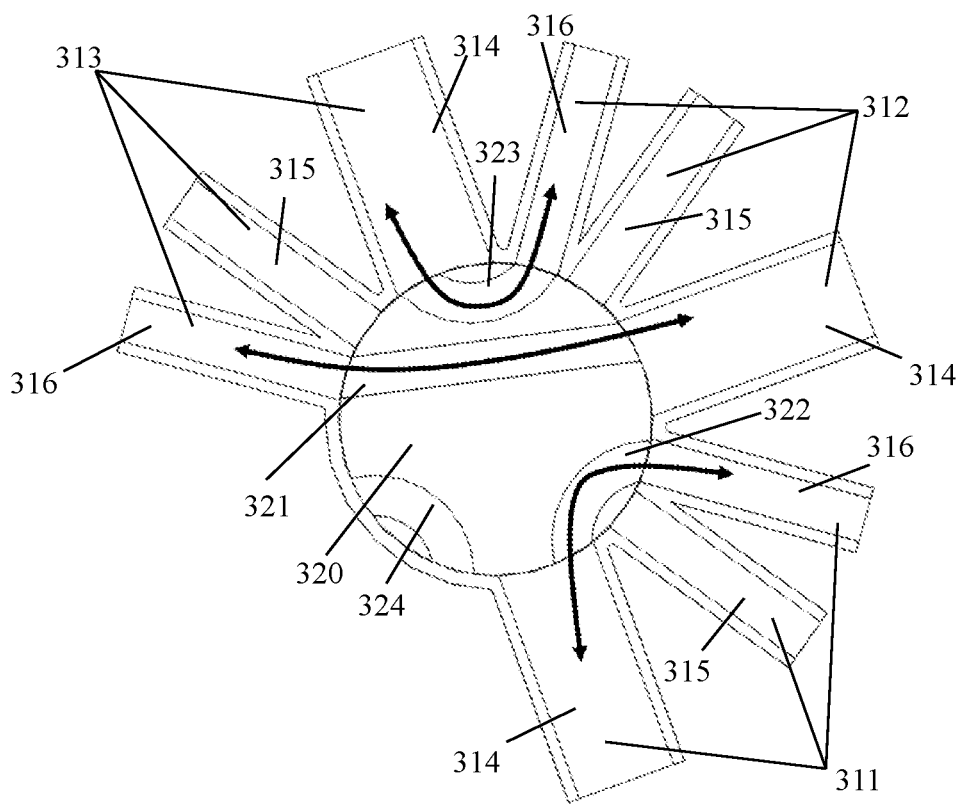
FIG. 16A is a top cross-sectional view of the multi-port valve shown in FIG. 8 in a sixth work mode, and the hatching has been omitted for simplicity.
Figure 16B:
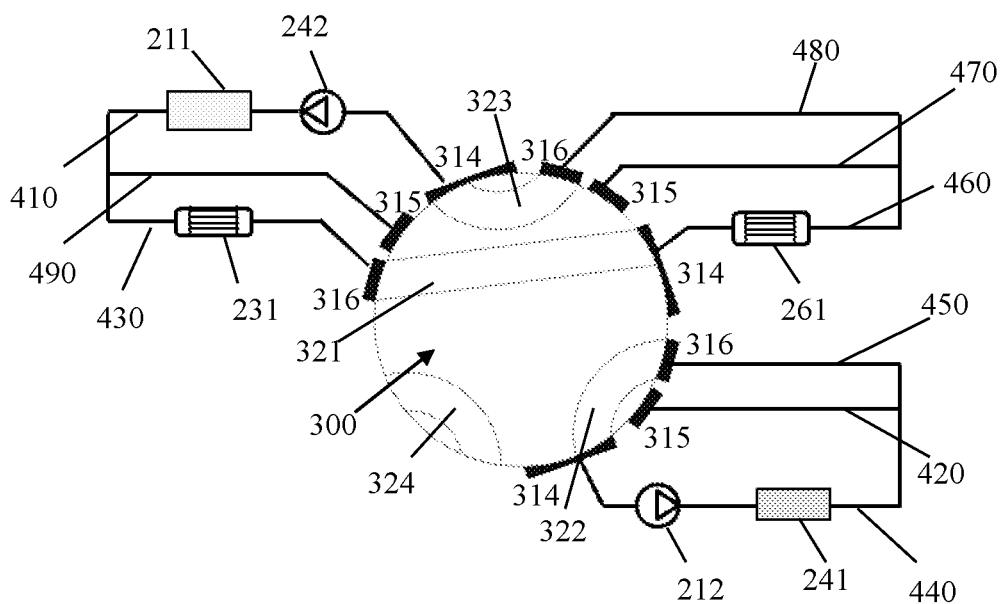
FIG. 16B is a schematic diagram of a thermal management system including the multi-port valve shown in FIG. 16A.

Referring to FIGS. 16A and 16B, when the multi-port valve 300 works on a sixth work mode, the first flow channel 321 communicates the main port 314 of the second port group 312 with the second sub-port 316 of the third port group 313; and the third flow channel 323 communicates the main port 314 of the third port group 313 with the second sub-port 316 of the second port group 312. Thus, the fourth common branch 480 and the ED cooling branch 410 are in fluid communication with each other via the third flow channel 323; and the radiator branch 430 and the chiller branch 460 are in fluid communication with each other via the first flow channel 321. Under the action of the second pump 242, the coolant flows through the chiller 261 and the radiator 231 to for heat exchanging and then cooling the electric drive 211. At the same time, the fourth flow channel 324 communicates the main port 314 of the first port group 311 with the second sub-port 316 of the first port group 311. Under the action of the first pump 212, the coolant flows through the battery 241 to cool it.

Figure 17:
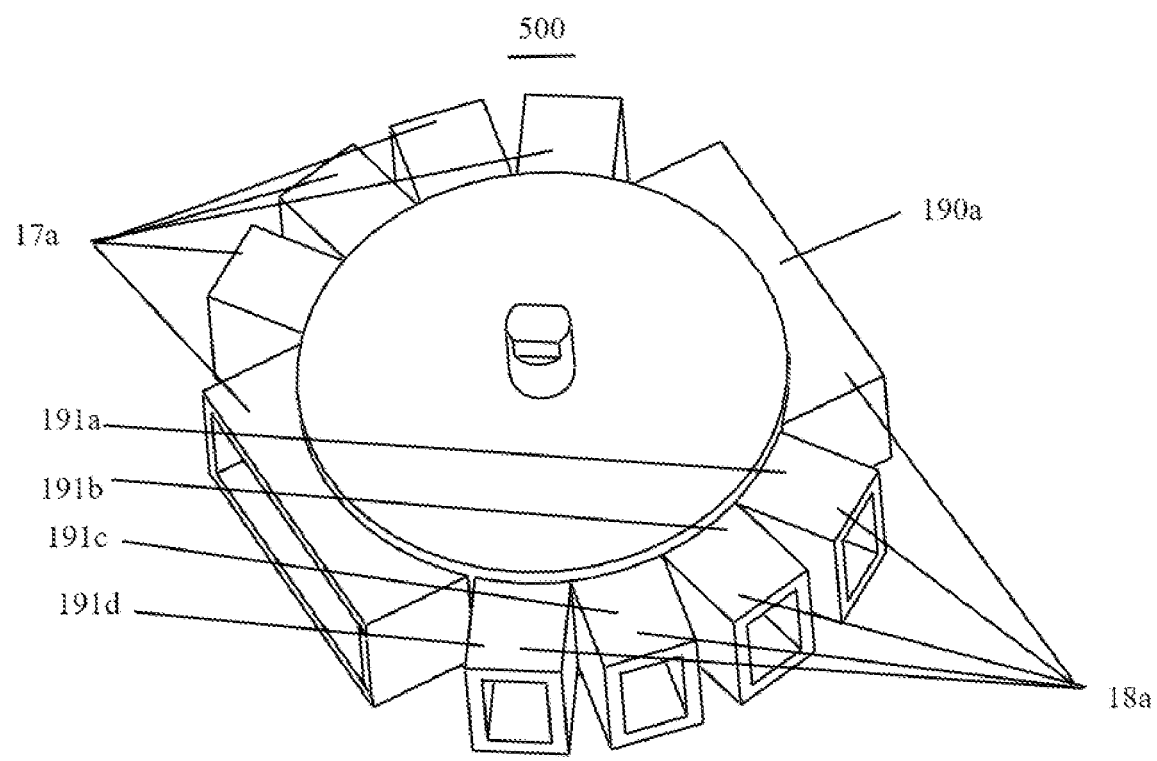
FIG. 17 is a perspective view of a multi-port valve according to a third embodiment of the present invention.
Figure 18:
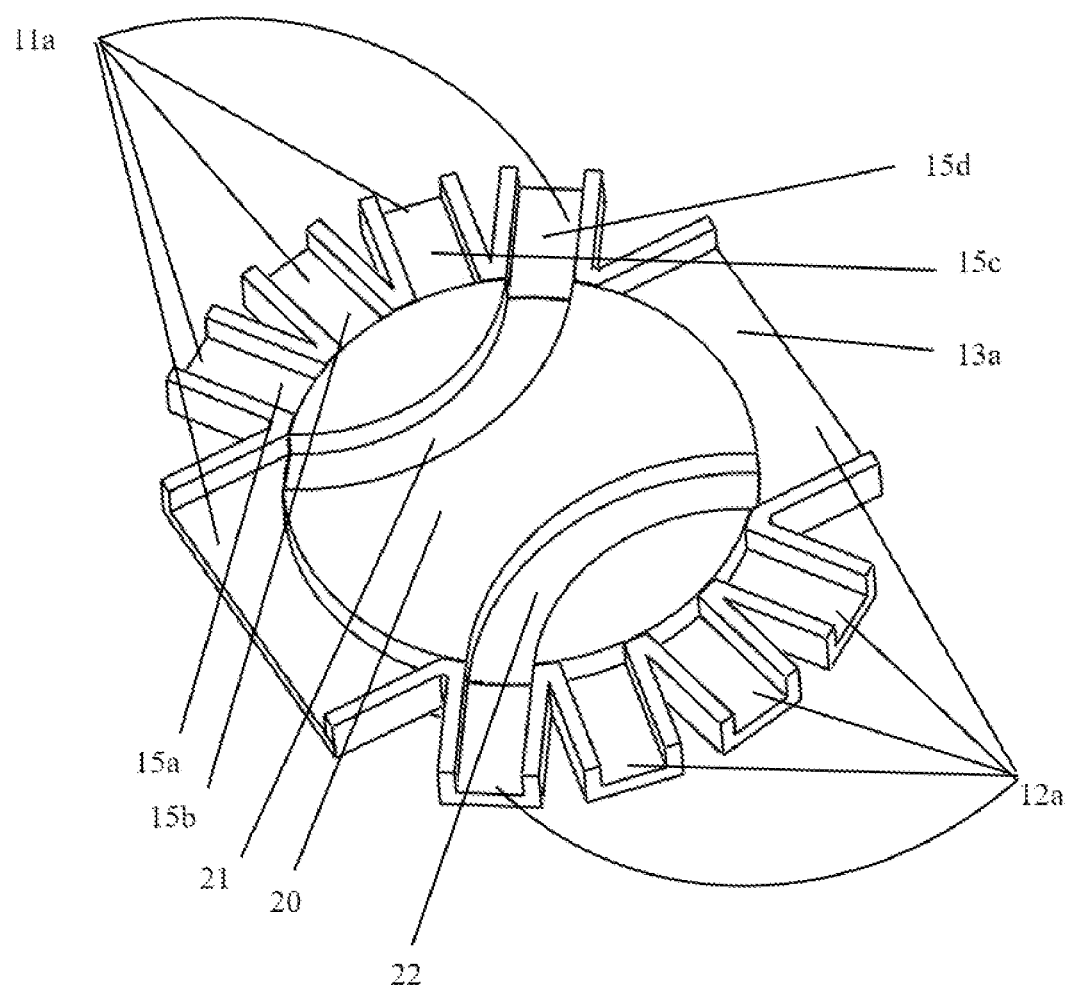
FIG. 18 is a perspective cross-sectional view of the multi-port valve shown in FIG. 17, with the hatching omitted for simplicity.

Referring to FIGS. 17 to 18, a multi-port valve 500 of a second embodiment of the present invention is similar to the multi-port valve 100 of the first embodiment of the present invention. the main difference between the two is number of the flow channels and port groups, and thus work modes of the multi-port.

the multi-port valve 500 of the third embodiment of the present invention is similar to the multi-port valve 100 of the first embodiment, except that number of ports of a valve housing 10*a* corresponding to the valve core 20 is changed, and thereby differences in the work mode of the valve. The communication between the branches (adaptive adjusted) of the thermal management system of vehicle and the multi-port valve 500 in different work modes can be referred to the first embodiment and will not be repeated here.

Specifically, in this embodiment, the valve housing 10a includes a first flow guide arm group 17a and a second guide arm group 18a arranged in sequence along a circumferential direction of the central hub 16. The first flow guide arm group 17a and the second flow guide arm group 18a correspondingly forms a first port group 11a and second port group 12a. Specifically, each of the first flow guide arm group 17a and the second flow guide arm group 18a includes a main arm 190a, a first sub-arm 191a, a second sub-arm 191b, a third sub-arm 191c and a fourth sub-arm 191d. Each of the main arms 190a, the first sub-arms 191a, the second sub-arms 191b, the third sub-arms 191c and the fourth sub-arms 191d defines a through hole extending radially and communicate with the receiving cavity 160 of the central hub 16 to respectively form main port 13a, a first sub-port 15a, a second sub-ports 15b, a third sub-port 15c, and a fourth sub-ports 15d. Preferably, the main ports 13a, the first sub-ports 15a, the second sub-ports 15b, the third sub-ports 15c and the fourth sub-ports 15d of the first port group 11a and the second port group 12a are located in the same horizontal plane. More preferably, the first port group 11a and the second port group 12a are centre-symmetrical with each other. Also preferably, central angles included by all the sub-ports are approximately equal. A central angle included the main port 13a of each of the first port group 11a and the second port group 12a is equal to a sum of the central angles included all the sub-ports in the same port group.

Different work modes of the multi-port valve 500 of this embodiment are described below.

Figure 19:
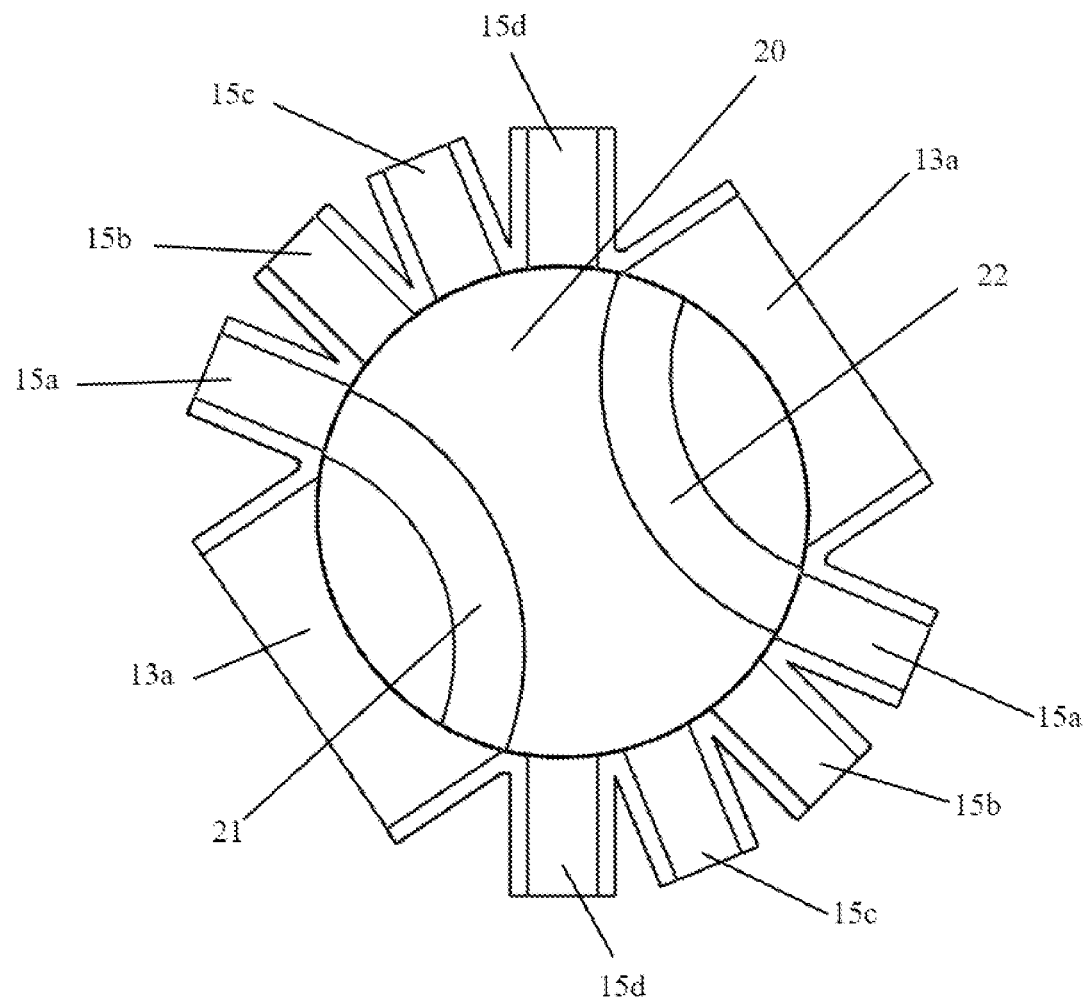
FIGS. 19 to 26 are top cross-sectional views of the multi-port valve shown in FIG. 17 in the first to eighth work modes, and the hatching has been omitted for simplicity.

Referring to FIG. 19, in a first work mode of the multi-port valve 500 of the present embodiment, the valve core 20 is rotated to desired position so that the first flow channel 21 thereof communicates with the main port 13a of the first port group 11a and the first sub-port 15a of the first port group 11a; and the second flow channel 22 communicates with the main port 13a of the second port group 12a and the first sub-port 15a of the second port group 12a.

Figure 20:
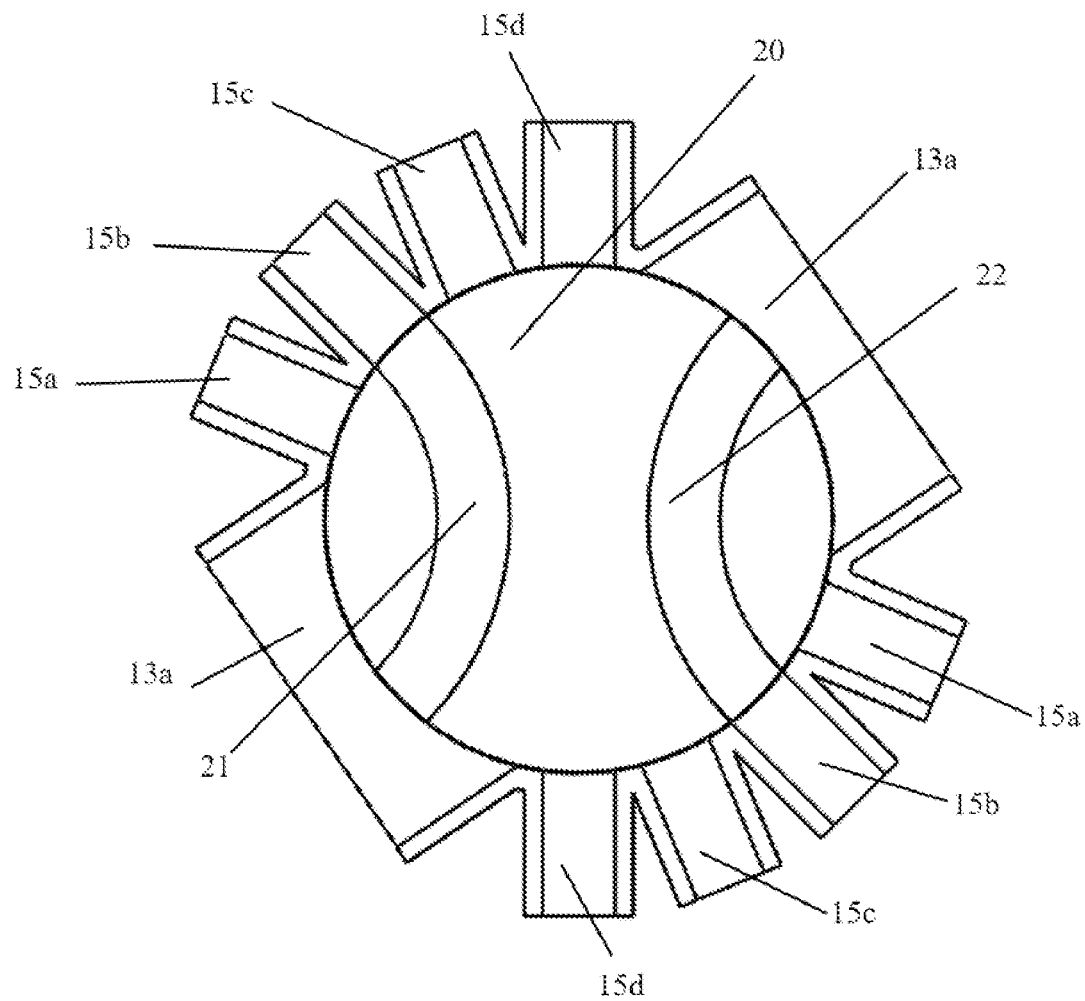

Referring to FIG. 20, in a second work mode of the multi-port valve 500 of the present embodiment, the valve core 20 is rotated to another position so that the first flow channel 21 thereof communicates the main port 13a of the first port group 11a with the second sub-port 15b of the first port group 11a; and the second flow channel 22 communicates the main port 13a of the second port group 12a with the second sub-port 15b of the second port group 12a.

Figure 21:
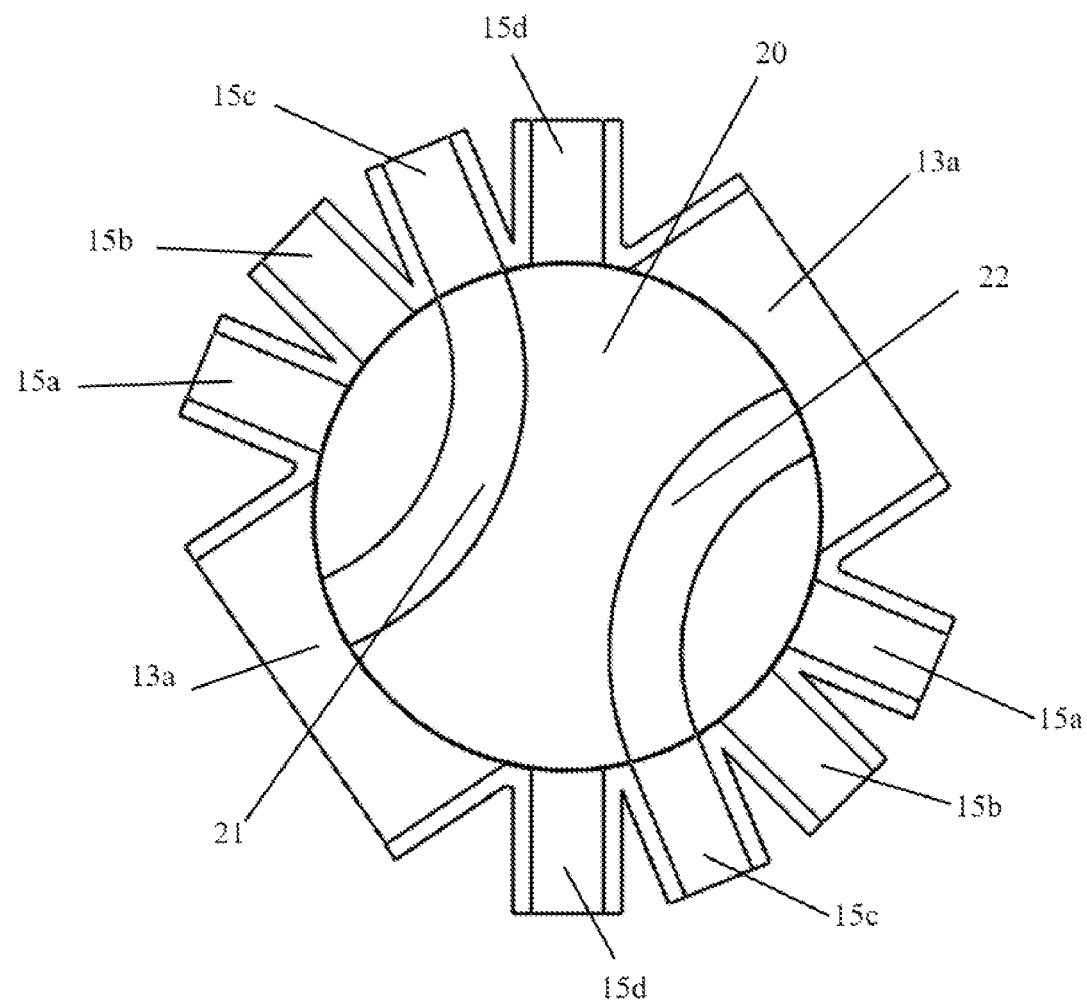

Referring to FIG. 21, in a third work mode of the multi-port valve 500 of the present embodiment, the valve core 20 is rotated to a corresponding position so that the first flow channel 21 thereof communicates the main port 13a of the first port group 11a with the third sub-port 15c of the first port group 11a; and the second flow channel 22 communi-cate the main port 13a of the second port group 12a with the third sub-port 15c of the second port group 12a.

Figure 22:
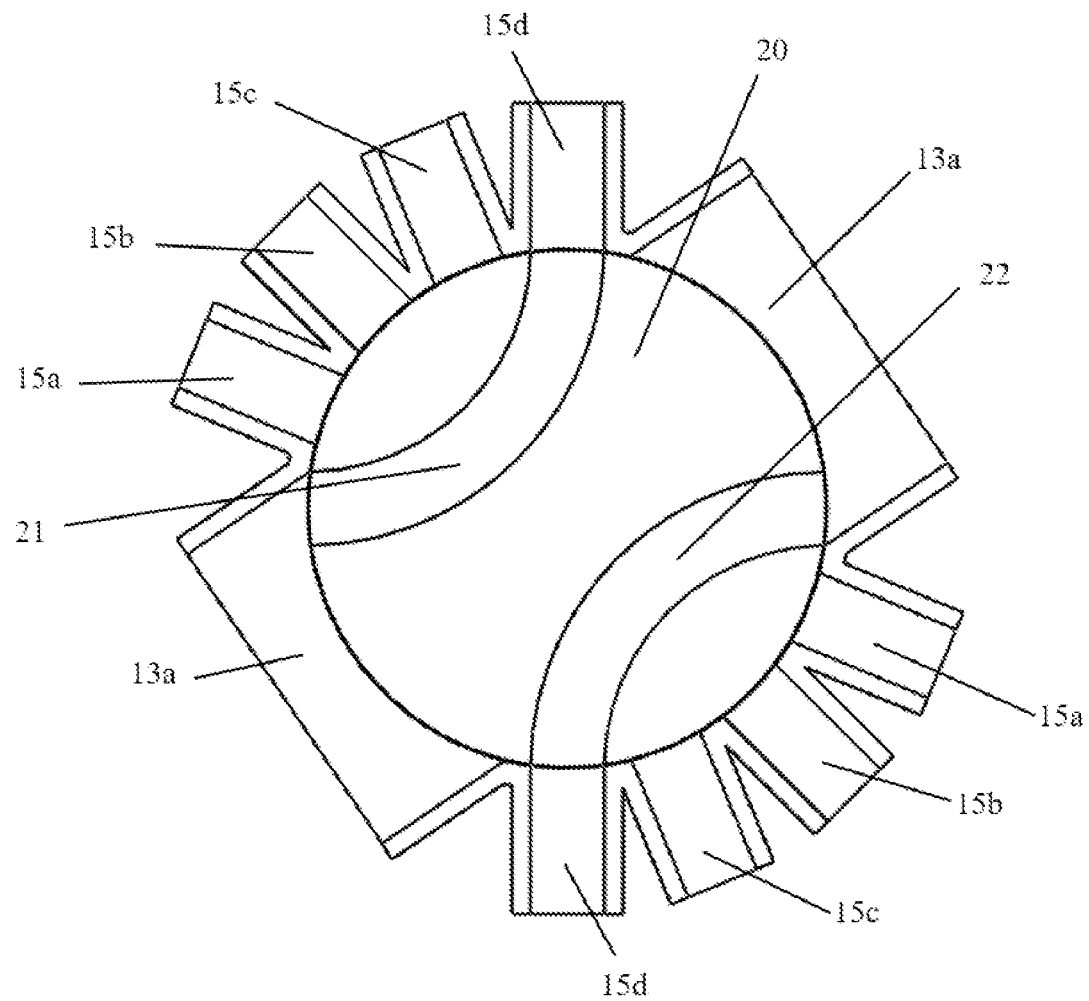

Referring to FIG. 22, in a fourth work mode of the multi-port valve 500 of the present embodiment, the valve core 20 is rotated to a corresponding position so that the first flow channel 21 thereof communicates the main port 13a of the first port group 11a with the fourth sub-port 11a of the first port group; the second flow channel 22 communicates the main port 13a of the second port group 12a with the fourth sub-port 15d of the second port group 12a.

Figure 23:
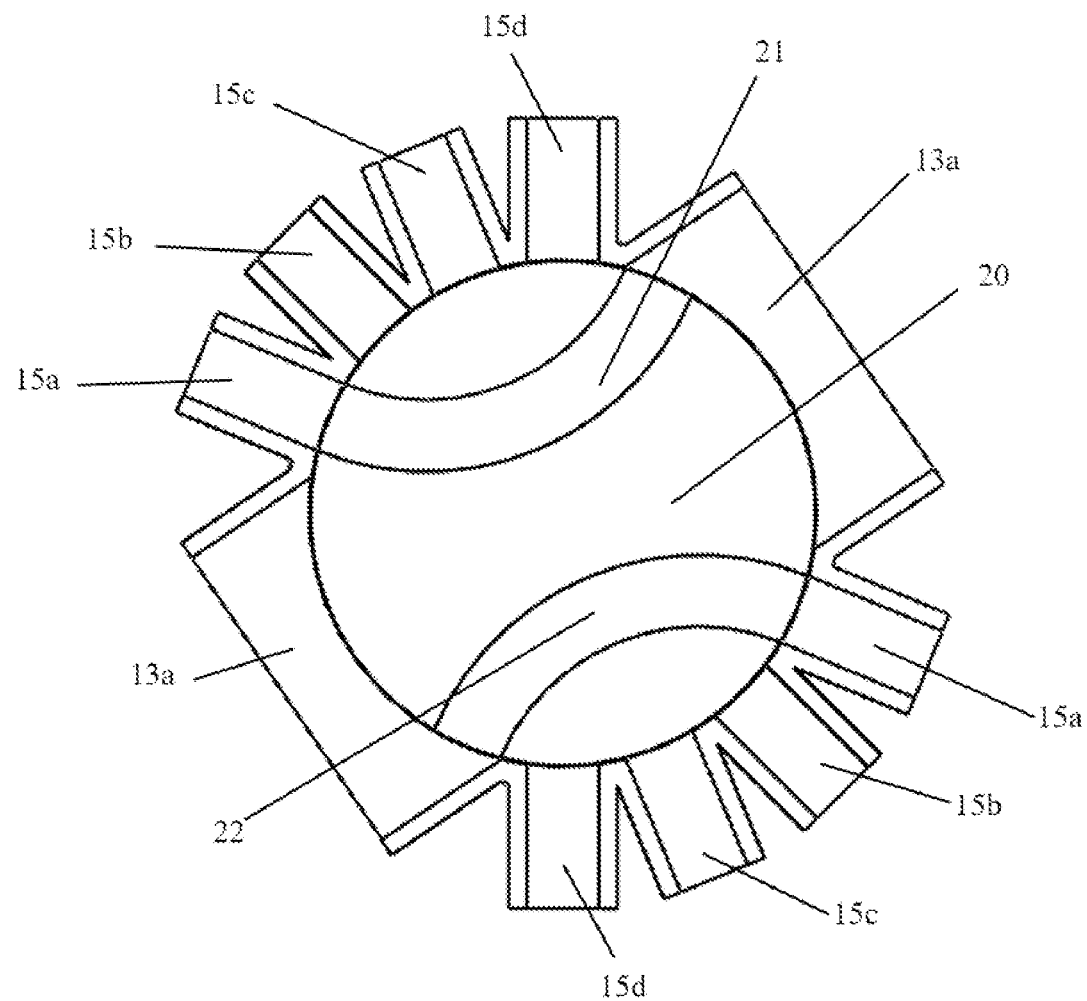

Referring to FIG. 23, in a fifth work mode of the multi-port valve 500 of the present embodiment, the valve core 20 is rotated to a corresponding position so that the first flow passage 21 thereof communicates the main port 13a of the second port group 12a with the first sub-port 15a of the first port group 11a; and the second flow channel 22 communicates the main port 13a of the first port group 11a with the first sub-port 15a of the second port group 12a.

Figure 24:
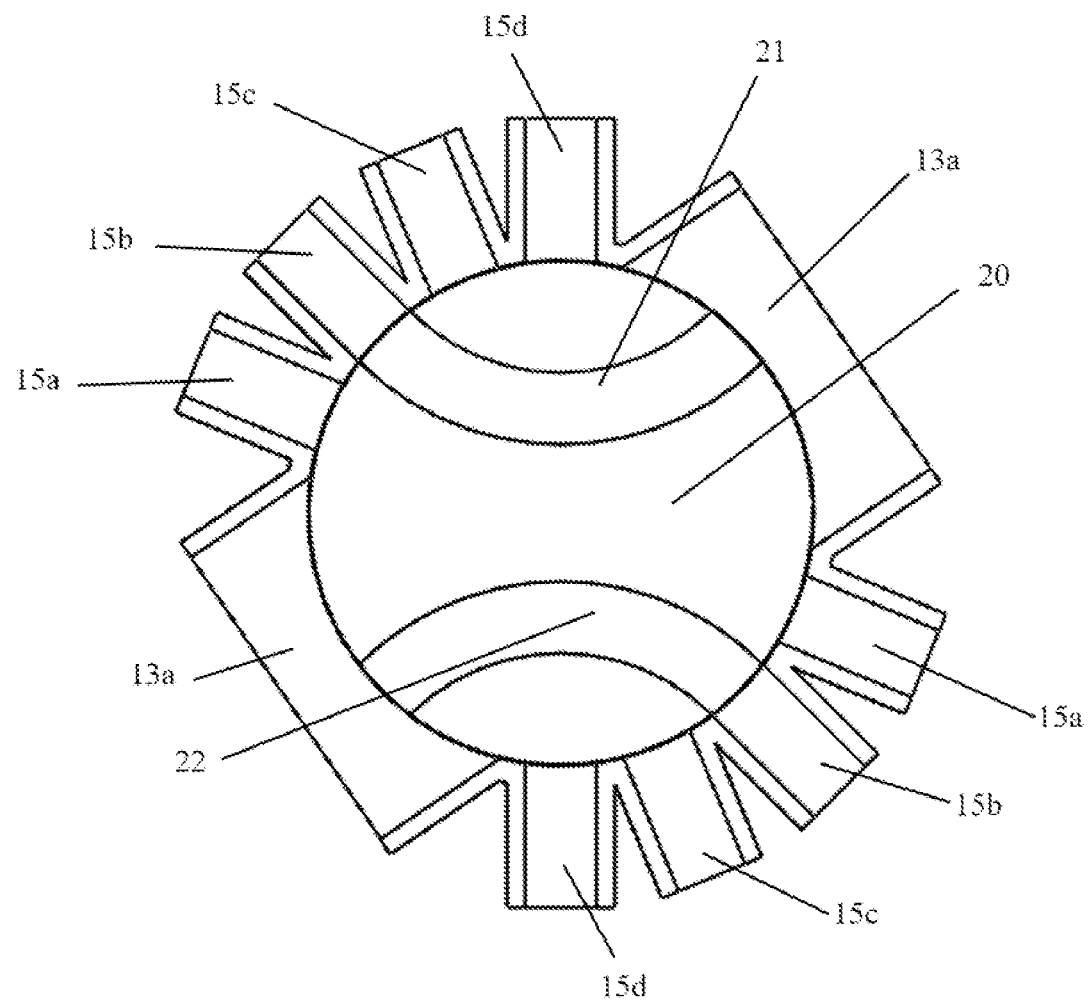

Referring to FIG. 24, in a sixth work mode of the multi-port valve 500 of the present embodiment, the valve core 20 is rotated to a corresponding position, so that the first flow passage 21 thereof communicates with the main port 13a of the second port group 12a and the second sub-port 15b of the first port group 11a; the second flow channel 22 communicates with the main port 13a of the first port group 11a and the second sub-port 15b of the second port group 12a.

Figure 25:
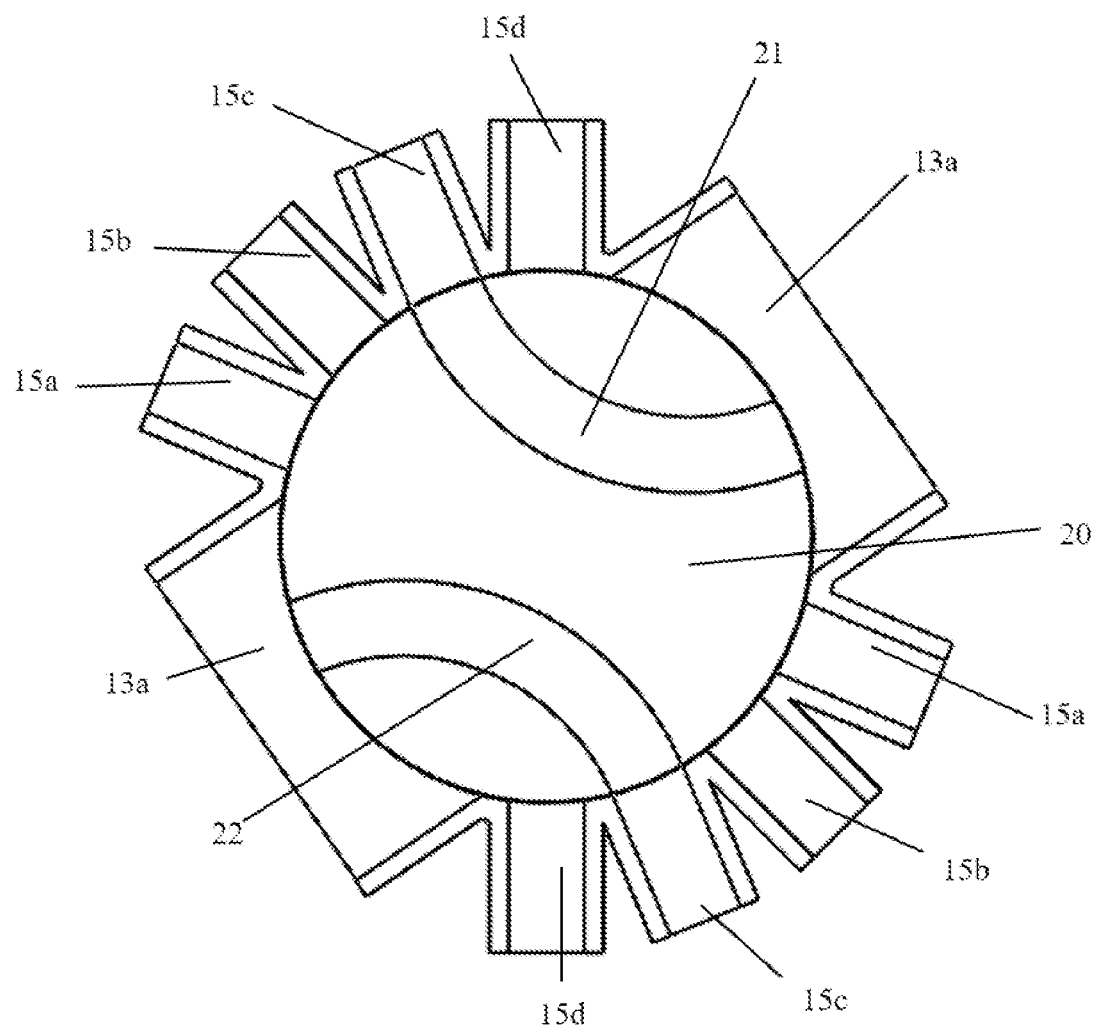

Referring to FIG. 25, in a seventh work mode of the multi-port valve 500 of the present embodiment, the valve core 20 is rotated to a corresponding position, so that the first flow channel 21 thereof communicates the main port 13a of the second port group 12a with the third sub-port 15c of the first port group 11a; and the second flow channel 22 communicates the main port 13a of the first port group 11a with the third sub-port 15c of the second port group 12a.

Figure 26:
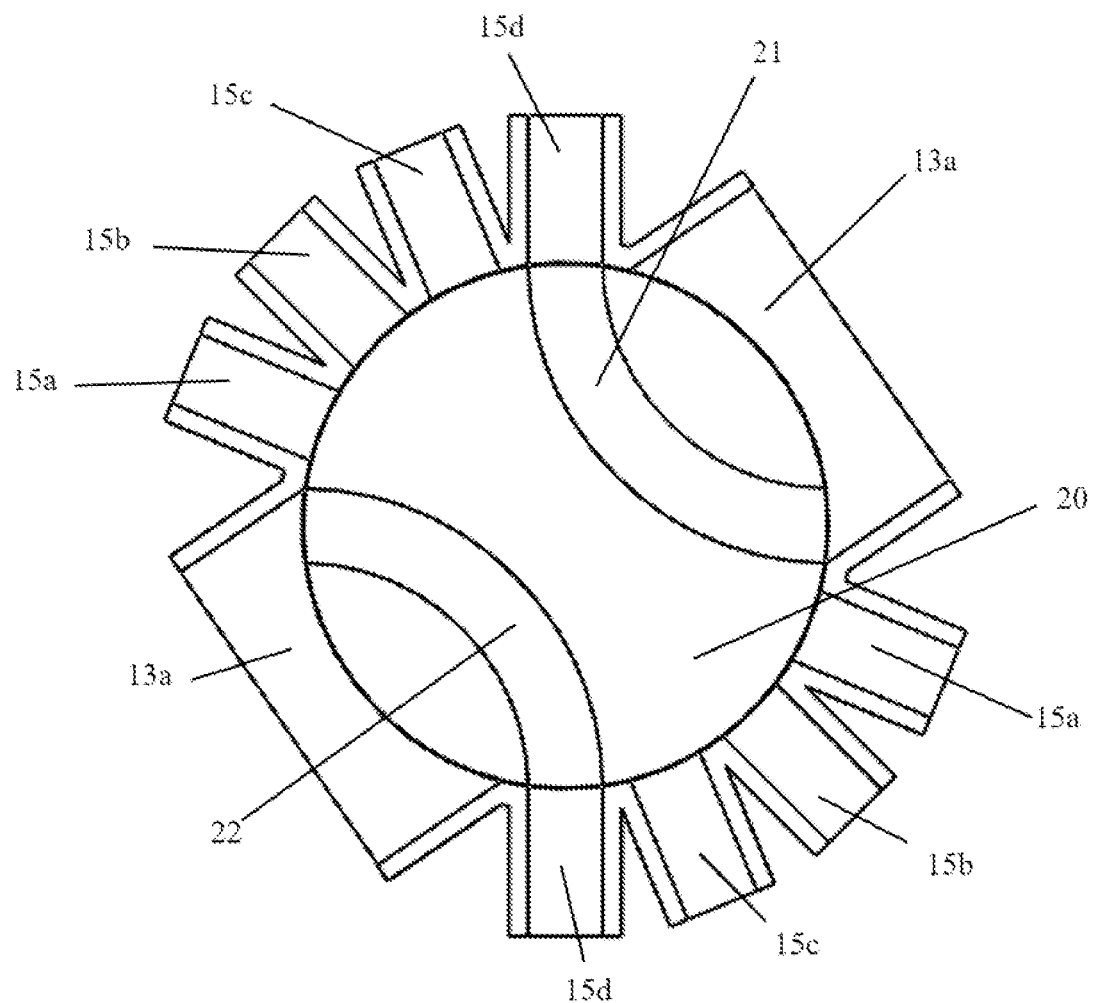

Referring to FIG. 26, in an eighth work mode of the multi-port valve 500 of the present embodiment, the valve core 20 is rotated to a corresponding position, so that the first flow passage 21 thereof communicates with the main port 13a of the second port group 12a and the fourth sub-port 15d of the first port group 11a; the second flow channel 22 communicates the main port 13a of the first port group 11a with the fourth sub-port 15d of the second port group 12a.

To sum up the above, in some embodiments, such as the first embodiment and the third embodiment, m flow channels are arranged in the valve core, m≥2, and the valve housing includes (1+k)*m ports, where k is the number of sub-ports in each port group, and k≥2. Also preferably, the valve housing includes m port groups arranged in a circumferential direction (that is, the number of port groups is the same as the number of flow channels), and the multi-port valve has k*m work modes. For example, in the first embodiment, the valve core is provided with 2 flow channels, and the number of sub-ports in each of the port groups of the valve housing is 2 (k=2), that is, the first sub-port 14 and the second sub-port 15. Therefore, the valve in the first embodiment includes a total of 6 ports and 4 work modes. For another example, e.g., the third embodiment, there are 2 flow channels in the valve core, and the number of sub-ports in each of the port groups is 4 (k=4), the valve includes a total of 10 ports and 8 work modes. It should be pointed out that, no matter in which embodiment, when the valve is switched between two different work modes, one of the flow channels will selectively communicates one of the main ports with two different sub-ports. In other words, any two ports are avoided from being kept in fluid communication with each other when the valve works on different work modes.

Additionally, in some embodiments, such as the first and second embodiments, the valve housing 10 includes n port groups arranged in a circumferential direction, and the multi-port valve has 2n work modes, where n≥2. For example, in the first embodiment, where the valve housing includes 2 port groups, the multi-port valve 100 has 4 work modes. For another example, e.g., the second embodiment, the valve housing includes 3 port groups the multi-port valve 300 has 6 work modes.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A multi-port valve, comprising a valve housing and a valve core, wherein the valve housing comprises a plurality of ports arranged in a circumferential direction, all the ports are grouped into a first port group, a second port group and a third port group, each of the first, second and third port groups includes a main port and a plurality of sub-ports; the valve core is rotatably mounted to the valve housing, and defines a first flow channel, a second flow channel, a third flow channel and a fourth flow channel correspondingly-at least two flow channels; the multi-port valve has a plurality of work modes in response to the valve core rotated as regard to the valve housing to different positions; in different work modes, each of the first, second and third flow channels is configured to selectively communicate one of the main ports with one of the sub-ports.

2. The multi-port valve according to claim 1, wherein central angles included by all the sub-ports are equal, a central angle included by each of the main ports is equal to a sum of the central angles included all the sub-ports in the same port group thereof.

3. The multi-port valve according to claim 1, wherein central angles included by openings at both ends of each of the flow channels are not greater than a central angle of each of the sub-ports.

4. The multi-port valve according to claim 1, wherein the multi-port valve has 6 work modes.

5. The multi-port valve of claim 1, wherein the first flow channel is straight, tecond flow channel, the third flow channel, and the fourth flow channel are arcuate-shaped, the second flow channel and the fourth flow channel are located on one side of the first flow channel, and the third flow channel is located on the other side of the first flow channel.

6. The multi-port valve according to claim 1, wherein the valve housing comprises a cylindrical central hub having a receiving cavity, and at least two flow guide arm groups arranged in sequence along a circumferential direction of the central hub, each of the flow guide arm groups includes a main arm and at least two sub-arms, the valve core is rotatably accommodated in the receiving cavity, the main arms and the sub-arms communicates with the receiving cavity of the central hub to form the main ports and the sub-ports.

7. A thermal management system, comprising the multi-port valve of the multi-port valve according to claim 1 and a plurality of coolant branches connected to corresponding ports of the multi-port valve, at least part of the coolant branches are connected in series to form a closed loop via one or more of the flow channels of the multi-port valve.

* * * * *